US010009655B2

United States Patent
Basra

(10) Patent No.: US 10,009,655 B2
(45) Date of Patent: Jun. 26, 2018

(54) DYNAMIC CONTENT PROVISIONING FOR MULTIMEDIA BROADCAST MULTICAST SERVICE OPERATION ON-DEMAND

(71) Applicant: Verizon Patent and Licensing Inc., Arlington, VA (US)

(72) Inventor: Arvind Basra, Glen Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days. days.

(21) Appl. No.: 14/865,259

(22) Filed: Sep. 25, 2015

(65) Prior Publication Data

US 2017/0094359 A1  Mar. 30, 2017

(51) Int. Cl.
| | |
|---|---|
| *H04N 21/472* | (2011.01) |
| *H04W 4/06* | (2009.01) |
| *H04L 29/06* | (2006.01) |
| *H04L 29/08* | (2006.01) |
| *H04N 21/466* | (2011.01) |
| *H04N 21/25* | (2011.01) |
| *H04N 21/258* | (2011.01) |
| *H04N 21/442* | (2011.01) |
| *H04N 21/24* | (2011.01) |
| *H04N 21/6405* | (2011.01) |
| *H04N 21/61* | (2011.01) |

(52) U.S. Cl.
CPC ... *H04N 21/47202* (2013.01); *H04L 65/1069* (2013.01); *H04L 65/4084* (2013.01); *H04L 67/22* (2013.01); *H04N 21/2402* (2013.01); *H04N 21/251* (2013.01); *H04N 21/25841* (2013.01); *H04N 21/25866* (2013.01); *H04N 21/44209* (2013.01); *H04N 21/4667* (2013.01); *H04N 21/6131* (2013.01); *H04N 21/6405* (2013.01); *H04W 4/06* (2013.01)

(58) Field of Classification Search
CPC ......... H04N 21/47202; H04N 21/4667; H04N 21/44209; H04N 21/2402; H04N 21/6405; H04N 21/6131; H04N 21/25841; H04W 4/06
See application file for complete search history.

(56) References Cited

U.S. PATENT DOCUMENTS

| | | | |
|---|---|---|---|
| 9,025,511 B2 * | 5/2015 | Zhu ........................ | H04W 4/06 370/312 |
| 9,363,788 B2 * | 6/2016 | Zhang ................. | H04W 72/005 |

(Continued)

*Primary Examiner* — Pinkal R Chokshi

(57) ABSTRACT

A method, a device, and a non-transitory storage medium to receive requests for a content from user devices located within a service area; transmit the content to the user devices; collect consumption data; analyze the consumption data; determine whether an on-demand, Multimedia Broadcast Multicast Service (MBMS) session is triggered based on an analysis of the consumption data; generate trigger data based on the analysis; store network provisioning profiles pertaining to the service area, wherein each network provisioning profile includes at least one unique network provisioning parameter and value relative to the other network provisioning profiles; select one of the network provisioning profiles based on a match between the trigger data and the at least one unique network provisioning parameter; and set up the on-demand, MBMS session based on the one of the network provisioning profile.

20 Claims, 17 Drawing Sheets

(56) References Cited

U.S. PATENT DOCUMENTS

| | | | |
|---|---|---|---|
| 2007/0195789 A1* | 8/2007 | Yao | H04L 47/14 370/395.21 |
| 2013/0007831 A1* | 1/2013 | Wu | H04N 21/23655 725/116 |
| 2013/0155871 A1* | 6/2013 | Zhu | H04W 4/06 370/241.1 |
| 2013/0276017 A1* | 10/2013 | Walker | H04N 21/44204 725/25 |
| 2015/0257162 A1* | 9/2015 | Reider | H04W 72/0486 370/230 |
| 2015/0270979 A1* | 9/2015 | Andrada | H04L 51/38 370/390 |
| 2016/0043879 A1* | 2/2016 | Chandwani | H04L 12/189 370/312 |
| 2016/0119395 A1* | 4/2016 | Li | H04L 12/189 709/219 |

\* cited by examiner

| NETWORK PROVISIONING DATA TABLE 460 | | | |
|---|---|---|---|
| SERVICE ID | USER LOCALE | CONTENT DELIVERY | CONTENT TYPE |
|  |  |  |  |
|  |  |  |  |

485-1 → (first row)
485-Z → (last row)
↑ 465  ↑ 470  ↑ 475  ↑ 480

Fig. 4C

DYNAMIC CONTENT PROVISIONING FOR MULTIMEDIA BROADCAST MULTICAST SERVICE OPERATION ON-DEMAND

BACKGROUND

The Multimedia Broadcast Multicast Service (MBMS) is a point-to-multipoint (PMP) service in which data is transmitted from a source to multiple destinations. The MBMS is designed to provide various types of content to end devices using broadcast and multicast delivery methods. The MBMS implemented in a Long Term Evolution (LTE) network is known as Evolved MBMS (eMBMS).

BRIEF DESCRIPTION OF THE DRAWINGS

FIG. 4C is a diagram of an exemplary table that stores exemplary network provisioning data.

DETAILED DESCRIPTION OF PREFERRED EMBODIMENTS

Figure 1:
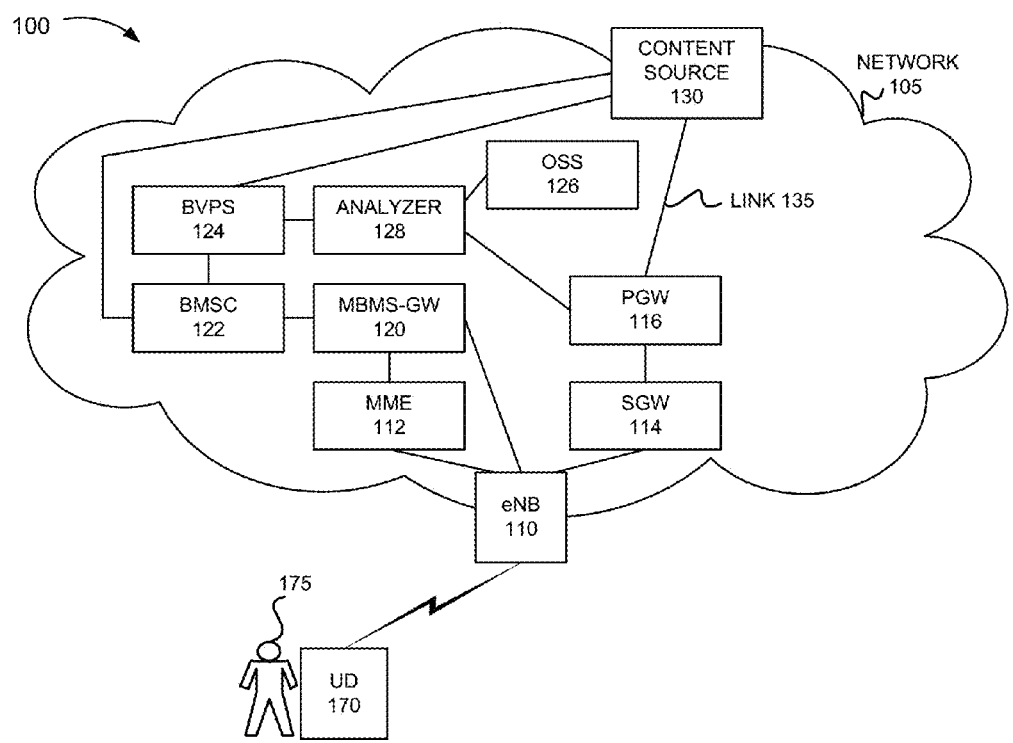
FIG. 1 is a diagram illustrating an exemplary environment in which an exemplary embodiment of a management service for the MBMS may be implemented.

The following detailed description refers to the accompanying drawings. The same reference numbers in different drawings may identify the same or similar elements. Also, the following detailed description does not limit the invention.

According to an exemplary embodiment, a management service for the MBMS is provided. According to an exemplary embodiment, the management service provides for the automatic provisioning and de-provisioning of an MBMS session, on-demand (e.g., MBMS Operation On Demand (MooD)), relative to any content with respect to a service area (e.g., a geographic locale). This is in contrast to other possible approaches in which only a subset of content can be selected for MBMS delivery. For example, the subset of content are pre-chosen as likely candidate contents for MBMS delivery based on various criteria pertaining to popularity. For example, a program service provider or a program delivery system may earmark some contents as popular, while other contents do not have such earmarks, based on expected demand and/or current demand for the contents.

According to an exemplary embodiment, the management service includes a collection service. According to an exemplary embodiment, the collection service is implemented at the content source. For example, the content source may be an application server, a web server, a streaming server, a file server, etc., that may store and make available content for the MBMS.

According to another exemplary embodiment, the collection service is implemented at another network element via which content is delivered to users. For example, in a Long Term Evolution (LTE) network, the Packet Data Network Gateway (PGW) may include the functionality associated with the collection service. The collection service collects, in real-time or near real-time (e.g., no significant delay, substantially real-time), consumption data pertaining to user consumption of contents. The collection service stores the consumption data and makes available the consumption data to an analytic service for analysis.

According to an exemplary embodiment, the consumption data includes data pertaining to user requests for content before an MBMS session is established. For example, the consumption data includes data pertaining to user requests to receive content via traditional on-demand unicast sessions. As described further below, an analytics service determines whether, in view of the consumption data, an on-demand, MBMS session should be established for the content within a service area. Additionally, according to an exemplary embodiment, the consumption data includes data pertaining to the consumption of content during the on-demand, MBMS session. For example, the analytics service determines whether, in view of the consumption data, the on-demand, MBMS session should remain active or be torn down.

According to an exemplary embodiment, the management service includes the analytics service. According to an exemplary embodiment, the analytics service is implemented at the content source. According to another exemplary embodiment, the analytics service is implemented at another network element. For example, the network element may be a business informatics or trending analytics system, a network probe, or some other network element that measures trends across all content sources that may store and make available content for the MBMS.

According to an exemplary embodiment, the analytics service analyzes the consumption data. According to an exemplary embodiment, the analytics service compares consumption parameters and their values, which are included in the consumption data, to threshold consumption parameters and threshold values. As described further below, the threshold consumption parameters and threshold values provide a basis for determining whether an on-demand, MBMS session is to be set-up, to remain up, or to be torn down. For example, according to an exemplary embodiment, based on the analysis of the consumption data, when an on-demand, MBMS session does not exist for a particular content in a service area, the analytics service determines whether an on-demand, MBMS session should be set up for the particular content in the service area. Additionally, based on the analysis of the consumption data, when an on-demand, MBMS session is already set up for the particular content in a service area, the analytics service determines whether the on-demand, MBMS session should remain up or be torn down. According to an exemplary embodiment, the analytics service instructs a network provisioning service whether to set up or tear down an on-demand, MBMS session based on a result of the analysis. According to an exemplary implementation, the analytics service stores and makes available trigger data to the network provisioning service.

According to an exemplary embodiment, the management service includes the network provisioning service. The network provisioning service sets up and tears down, on-demand, MBMS sessions based on the trigger data provided by the analytics service. According to an exemplary embodiment, network provisioning service stores provisioning data. According to exemplary implementation, the provisioning data includes provisioning profiles in which each provisioning profile includes at least one unique parameter value relative to other provisioning profiles. Additionally, the provisioning data includes a mapping between service areas and provisioning profiles. For example, one service area may be mapped to one set of provisioning profiles, and another service area may be mapped to a different set of provisioning profiles. The set of provisioning profiles mapped to a service area may correspond to candidate, network resource allocation combinations that have been derived for the service area based on the network resource signature of the service area. The network provisioning service selects a particular provisioning profile from the set of available provisioning profiles based on the trigger data. Once a provisioning profile is selected, an on-demand, MBMS session may be set up based on the provisioning data included in the selected provisioning profile.

According to an exemplary embodiment, the network provisioning service schedules an on-demand, MBMS session. The network provisioning service supplies schedules to user devices and, in turn, the user devices can receive a particular content via the MBMS session or via a non-MBMS session.

The term "content," as used herein, is intended to be broadly interpreted to include any content deliverable via an MBMS session, such as live streaming (e.g., audio and/or video) and file delivery (e.g., a file, a sequence of files, etc.). For example, content may correspond to audio data, video data, audio and video data, software, image data, text data, animation data, multimedia data, Web data, Internet data, some combination thereof, or the like (e.g., machine-to-machine M2M file). The term "MBMS" is intended to include not only the MBMS, but also an evolved MBMS (eMBMS) and any other network MBMS. The MBMS may use a single-frequency network (SFN) technology or configuration to distribute content into one or multiple service areas (e.g., cells, locales, etc.).

FIG. 1 is a diagram illustrating an exemplary environment 100 in which an exemplary embodiment of a management service may be implemented. As illustrated, environment 100 includes a network 105. Network 105 includes exemplary network elements. The network elements include an evolved Node B (eNB) 110, a Mobility Management Entity (MME) 112, a Serving Gateway (SGW) 114, a PGW 116, an MBMS Gateway (MBMS-GW) 120, a Broadcast Multicast Service Center (BMSC) 122, a Broadcast Video Provisioning System (BVPS) 124, an Operations Support System (OSS) 126, an analyzer 128, and a content source 130. Additionally, environment 100 includes a user device (UD) 170 operated by a user 175. For purposes of description, user device 170 is not considered a network element.

As further illustrated, communicative links exist between the network elements (although only one is referenced in FIG. 1 as a link 135). A network element may transmit and/or receive data via link 135. Environment 100 may be implemented to include wireless and/or wired (e.g., electrical, optical, etc.) links 135 among the network elements and user device 170. A connection between network elements and/or a network element and user device 170 may be direct or indirect. For example, an indirect connection may involve an intermediary device or network element and/or an intermediary network not illustrated in FIG. 1. Additionally, the number, the type (e.g., wired, wireless, etc.), and the arrangement of links 135 illustrated in environment are exemplary.

A network element may be implemented according to a centralized computing architecture, a distributed computing architecture, or a cloud computing architecture (e.g., an elastic cloud, a private cloud, a public cloud, etc.). Additionally, a network element may be implemented according to one or multiple network architectures (e.g., a client device, a server device, a peer device, a proxy device, and/or a cloud device).

The number of network elements, the number of networks, and the configuration in environment 100 are exemplary. According to other embodiments, environment 100 may include additional network elements, fewer network elements, and/or differently arranged network elements, than those illustrated in FIG. 1. For example, with reference to the LTE architecture, in practice there are typically multiple instances of the network elements illustrated (e.g., multiple eNBs 110, SGWs 114, PGWs 116, etc.). Additionally, or alternatively, with reference to the MBMS architecture, there may be multiple instances of the network elements illustrated (e.g., multiple MBMS-GWs 120, etc.). Additionally, or alternatively, according to other embodiments, the MBMS architecture may include an MBMS Coordination Entity (MCE). Additionally, or alternatively, environment 100 may include an additional network and/or arrangement of networks that is different from that illustrated in FIG. 1. For example, network 105 may be connected to another network (not illustrated). The other network may include other network devices (not illustrated).

Also, according to other embodiments, one or more functions and/or processes described as being performed by a particular network element or a particular component of a network element may be performed by a different network element or a different component, or some combination of network elements or components, which may or may not include the particular network element or the particular component.

Network 105 may include one or multiple networks of one or multiple types. For example, network 105 includes a wireless network. According to an exemplary embodiment, network 105 may be implemented to include an LTE network and/or an LTE-Advanced (LTE-A) network. According to other embodiments, network 105 may be implemented to include other types of wireless or mobile communication networks, such as a 3rd Generation (3G) network, a 3.5G network, a 4.5G network, etc. By way of further example, network 105 may be implemented to a Universal Mobile Telecommunications System (UMTS) network, a Global System for Mobile Communications (GSM) network, a Wideband Code Division Multiple Access (WCDMA) network, an Ultra Mobile Broadband (UMB) network, a High-Speed Packet Access (HSPA) network, an Evolution Data Optimized (EV-DO) network, a Worldwide Interoperability for Microwave Access (Wi-MAX) network, and/or another type of wireless network (e.g., a future generation wireless network architecture, etc.). Network 105 may include a wired network. For example, network 105 may include an optical network or a cable network.

Although not illustrated, network 105 may include other network elements that pertain to various network-related aspects, such as access control, routing, security, network policies, etc.

ENB 110 includes a network device that may operate according to an LTE or an LTE-A standard. Among other functionalities, eNB 110 transmits to and receives from user device 170 wireless communications including bearer and signaling messages using Evolved UMTS Terrestrial Radio Access (E-UTRA) protocols. ENB 110 also communicates with other network elements (e.g., MME 112 and SGW 114) using various network interfaces and protocols according to the LTE or LTE-A standard. ENB 110 is merely an example of a wireless node of an Evolved UMTS Terrestrial Radio Access Network (E-UTRAN), and more generally of a RAN. According to other examples, as previously described, network 105 may include other RAN technologies. By way of further example, environment 100 may include a femto device, a pico device, a home eNB, a Node B, a WiFi router, a base station, a relay node, or other wireless node that provides wireless access (Worldwide Interoperability for Microwave Access (WiMAX), etc.). Additionally, or alternatively, according to other exemplary embodiments, network 105 may include wired nodes that provide user device 170 access to the MBMS.

MME 112 includes a network device that may operate according to the LTE or the LTE-A standard. Among other functionalities, MME 112 provides authentication, user device state handling, selection of SGW, and Evolved Packet System (EPS) bearer control. SGW 114 includes a network device that operates according to the LTE or the LTE-A standard. Among other functionalities, SGW 114 provides packet routing and forwarding, serves as a local mobility anchor for inter-eNB handovers, and a mobile interface for inter-3GPP mobility (e.g., relay traffic between 2G, 3G, etc. systems and PGW 116).

PGW 116 includes a network device that may operate according to the LTE or the LTE-A standard. Among other functionalities, PGW 116 provides policy enforcement, packet filtering, and network address allocation (e.g., Internet Protocol (IP) address) for user device 170. PGW 116 may also service as an anchor point for user device 170. According to an exemplary embodiment, PGW 116 provides the collection service included in the management service. The collection service includes collecting consumption data. According to an exemplary implementation, the consumption data includes location data that indicates a location of user device 170, content address data that indicates a location of the content, content type data that indicates an attribute of the content, content preference data that indicates a metric of delivery of the content, and persistency data that indicates a time period during which user 175 views and/or listens to content. A further description of the collection service and the consumption data is provided below.

As previously described, network 105 may include one or multiple networks of one or multiple types. In this regard, according to other embodiments, depending on the type of network architecture used, the collection service may be performed by another network element, such as a Gateway General Packet Radio Service (GPRS) Support Node (GGSN), a Packet Data Serving Node (PDSN), a High Rate Packet Data (HRPD) Serving Gateway (HSGW), a Home Agent (HA), or the like. Accordingly, PGW 116 is merely an example of a network element of the Evolved Packet Core (EPC), which, among other functionalities, acts as an interface between the LTE network and other PDNs (e.g., the Internet, an IP Multimedia Subsystem (IMS) network, etc.) and handles all user packets. Consequently, PGW 116 may be deemed as a candidate network element on which the collection service may be performed.

MBMS-GW 120 includes a network device that may operate according to an MBMS standard. Among other functionalities, MBMS-GW 120 transmits MBMS packets to eNB 110. According to an exemplary implementation, MBMS-GW 120 uses IP multicast as a means for forwarding MBMS user data from BMSC 122 to eNB 110. MBMS-GW 120 may perform MBMS Session Control Signaling (MSMS SCS) (e.g., session start/session stop) functions. According to environment 100, MBMS-GW 120 performs MBMS SCS to the E-UTRAN (e.g., eNB 110) via MME 112.

BMSC 122 includes a network device that may operate according to an MBMS standard. Among other functionalities, BMSC 122 ingests and prepares contents for broadcast and/or multicast transmission. BMSC 122 transmits contents via a user plane and commands via a control plane to MBMS-GW 120 so that contents are forwarded to appropriate eNBs (e.g., eNB 110) and locales serviced by the eNBs.

BVPS 124 includes a network device that provides the network provisioning service included in the management service. BVPS 124 manages the provisioning and de-provisioning of on-demand, MBMS sessions and MBMS sessions. According to an exemplary embodiment, BVPS 124 stores provisioning data that includes provisioning profiles. According to an exemplary implementation, BVPS 124 provisions and de-provisions MBMS sessions automatically and on-demand based on trigger data. According to such an implementation, when an on-demand, MBMS session is to be started, BVPS 124 selects a particular provisioning profile based on the trigger data and instructs BMSC 122 to begin an on-demand, MBMS session based on the selected provisioning profile. Alternatively, when an on-demand, MBMS session is to be torn down, BVPS 124 instructs BMSC 122 to tear down the on-demand, MBMS session. BVPS 124 also manages scheduling of on-demand, MBMS sessions. According to an exemplary implementation, BVPS 124 publishes schedules via a service discovery channel. The service discovery channel data, which is carried by the service discovery channel, is continuously updated as on-demand, MBMS sessions are set up and torn down, so that user devices (e.g., user device 170) may receive contents via an on-demand, MBMS session or via an alternative method of delivery (e.g., unicast, an MBMS session, etc.). A further description of the network provisioning service is provided below.

OSS 126 includes a network device that allows network personnel to manage network 105 and/or network elements included in network 105. For example, OSS 126 may allow network personnel to manage network inventory, provision services, configure network elements, and manage faults.

Analyzer 128 includes a network device that provides the analytics service included in the management service. According to an exemplary embodiment, analyzer 128 includes an analytics engine that analyzes consumption data. Based on the analysis of the consumption data, when an on-demand, MBMS session does not exist for a particular content in a service area, the analyzer 128 determines whether an on-demand, MBMS session should be set up for the particular content in the service area. Additionally, based on the analysis of the consumption data, when an on-demand, MBMS session is already set up for the particular content in a service area, analyzer 128 determines whether the on-demand, MBMS session should be maintained or torn down. According to an exemplary embodiment, analyzer 128 generates trigger data based on a result of the analysis. The trigger data is stored and made available to the network provisioning service. According to various embodiments, analyzer 128 may be implemented as a separate network device (as illustrated in FIG. 1) or implemented within another network element (e.g., content source 130), as previously described. A further description of the analytics service is provided below.

Content source 130 includes a network device that is a source of content. For example, content source 130 may be implemented as an application server, a web site, a streaming server, a file server, or the like. According to an exemplary embodiment, content source 130 includes the collection service. According to an exemplary embodiment, content source 130 includes the analytics service. Link 135 provides a communication path between network elements and a network element and user device 170. Link 135 may have certain characteristics, such as bandwidth capacity, transmission data rate, and the like.

User device 170 includes a communicative and computational device. User device 170 may be implemented as a mobile device or a non-mobile device. By way of example, user device 170 may be implemented as a smartphone, a tablet, a phablet, a netbook, a computer (e.g., a desktop, a laptop, etc.), a personal digital assistant, an infotainment system or other system in a vehicle, or a wearable device (e.g., a watch, glasses, etc.), a kiosk, a point of sale terminal, a vending machine, a set top box, or a type of machine-to-machine (M2M) device (e.g., a meter device, a smart device, a security device, etc.). User 175 is an operator of user device 170. Depending on the type of end device, user 175 may or may not exist. According to an exemplary embodiment, user device 170 includes the collection service.

FIGS. 2A-2G are diagrams illustrating an exemplary embodiment of the management service in relation to an exemplary scenario. According to this embodiment, content source 130 includes the functionality of the collection service and the analytics service. Further, certain network elements previously described in relation to FIG. 1 have been omitted.

Figure 2A:
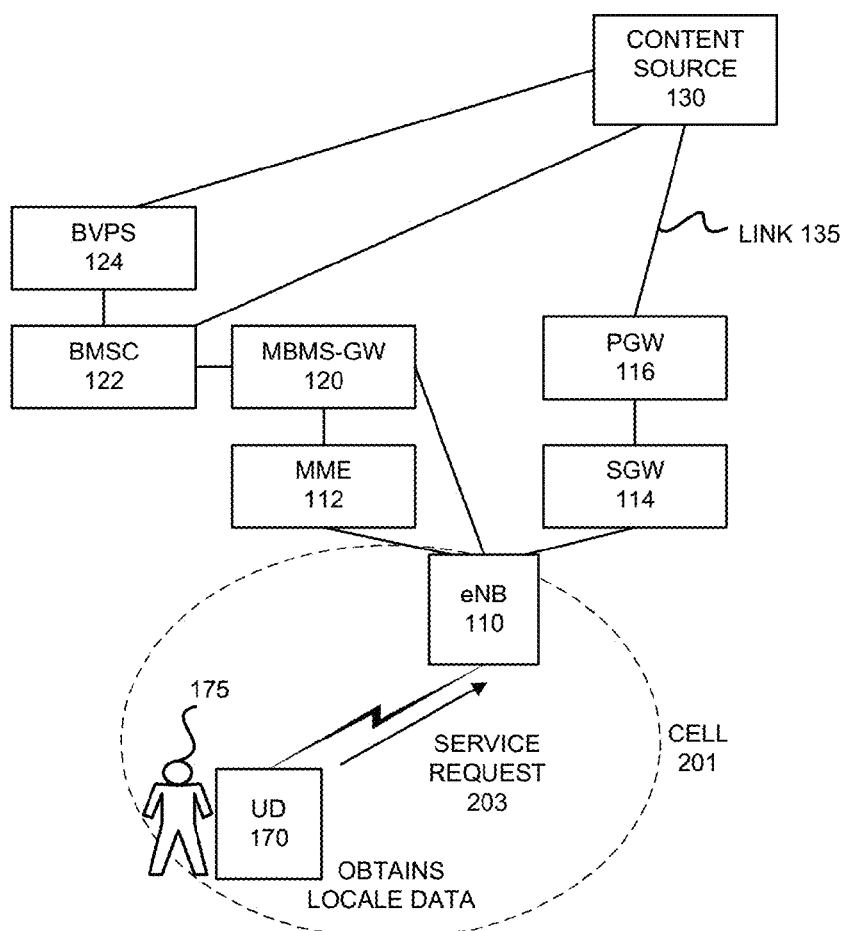
FIGS. 2A-2G are diagrams illustrating an exemplary scenario in which an exemplary embodiment of the management service may be implemented.

Referring to FIG. 2A, assume user 175 wishes to watch a breaking news story that is available at content source 130. While in a cell 201, user 175 executes an application via user device 170. For example, the application may be a web browser or other client application. According to an exemplary embodiment, user device 175 includes the collection service. The collection service includes obtaining locale data pertaining to user device 170 and/or locale data pertaining to a network element to which user device 170 is connected. Additionally, the collection service includes transmitting the locate data to the content source (e.g., content source 130). According to one exemplary implementation, the application includes logic that provides the collection service. For example, the collection service may be implemented in any application that can request and/or, render or present content that is deliverable via the MBMS. According to another exemplary implementation, an agent or a daemon application (e.g., a standalone) includes logic that provides the collection service. According to yet another exemplary implementation, the collection service may be implemented using a combination of logical entities. The locale data may indicate one or multiple instances of location, such as, for example, a service area name (e.g., Times Square, Fenway Park, etc.), a service area identifier (e.g., a numerical string, an alphanumeric string, etc.), a cell identifier (e.g., an E-UTRAN Cell Global Identifier (ECGI), etc.), a Tracking Area Code (TAC), a Physical Cell Identifier (PCI), a network element device identifier (e.g., a Global eNB Identifier, a femto device identifier, etc.), a Global Positioning System (GPS) coordinates (e.g., latitude and longitude), and/or the like. The collection service may use conventional or well-known methods to obtain the locale data.

Continuing with this exemplary scenario, user 175 selects a content to initiate a video streaming session. User device 170 generates a service request 203. Service request 203 includes the locale data. Depending on the protocol, available headers, trailers, and/or body of the message, etc., the locale data may be carried in various portions of a message. For example, an HTTP GET message may carry the locale data in a request-header field. By way of further example, the locale data (instead of the user's e-mail address) may be carried in the "From" field. Service request 203 also includes other relevant data, such as the Uniform Resource Indicator (URI) pertaining to the content, date and time, source network address, etc.

Figure 2B:
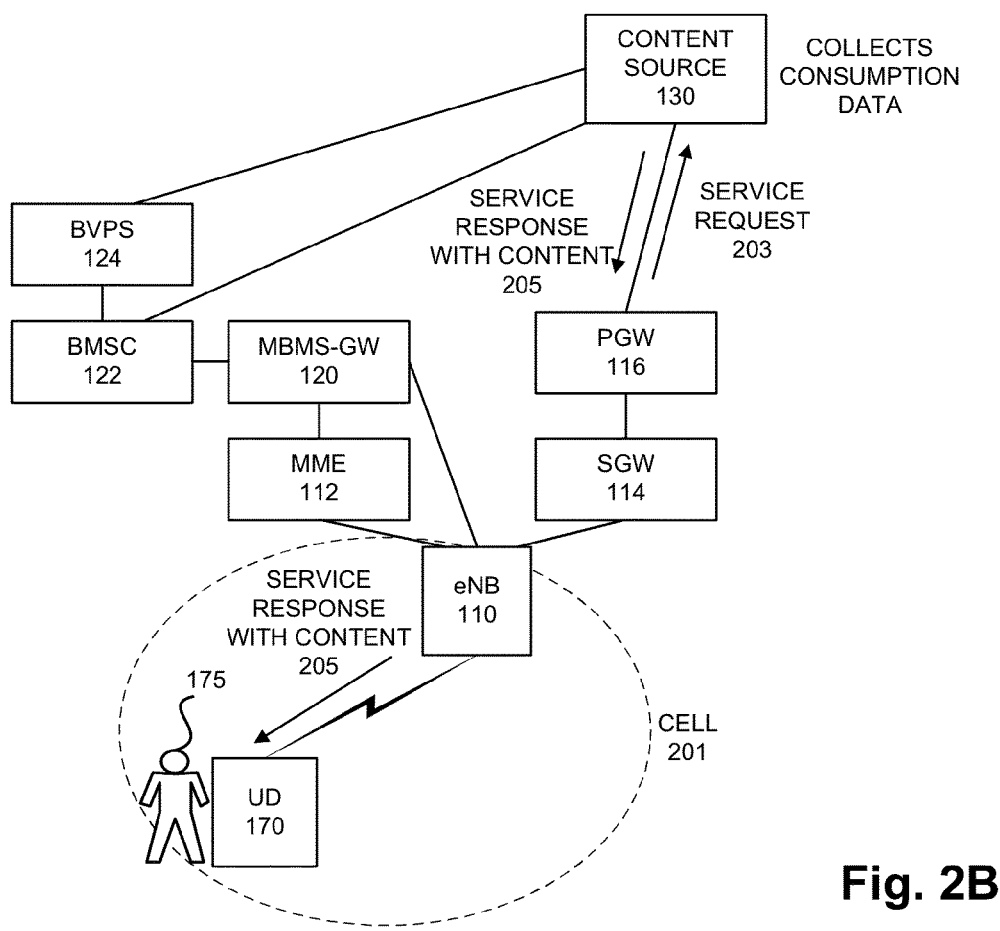

Referring to FIG. 2B, content source 130 receives service request 203. As explained above, content source 130 provides the collection service. The collection service may be performed continuously over time, reactively, periodically, etc. The collection service collects and stores consumption data from requests for contents and during on-demand, MBMS sessions pertaining to the contents. According to an exemplary implementation, the collection service may include deep packet inspection logic that is configured to identify certain data (i.e., consumption data). The collection service also includes logic to copy any identified consumption data and store the consumption data in, for example, a file, a data structure, or a database. Although, the collection service is described in relation to user 175 and user device 170, the collection service may collect and store consumption data pertaining to a large number of user devices.

Figure 4A:
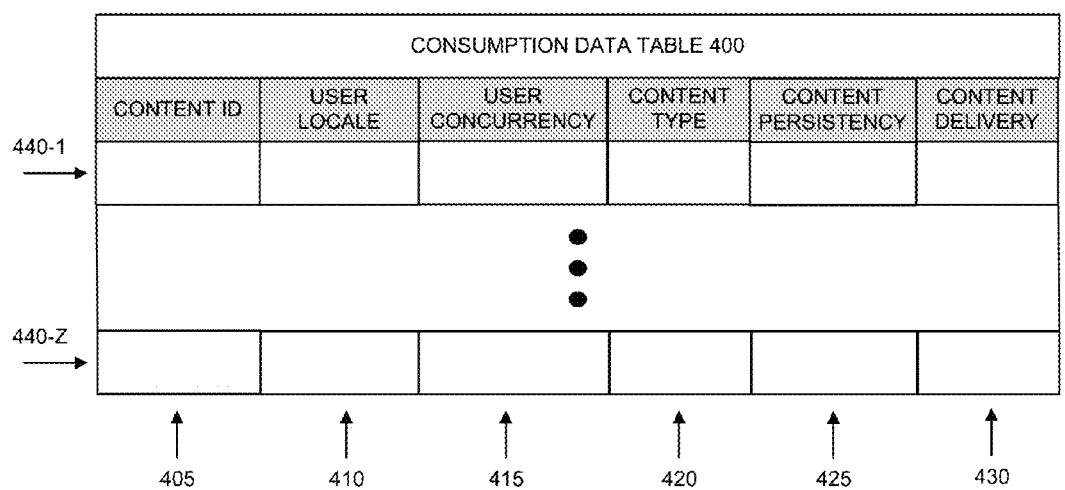
FIG. 4A is a diagram of an exemplary table that stores exemplary consumption data.

As described above, content source 130 stores the consumption data. For example, referring to FIG. 4A, content source 130 stores exemplary consumption data in a table 400. As illustrated, table 400 includes a content identifier field 405, a user locale field 410, a user concurrency field 415, a content type field 420, a content persistency field 425, and a content delivery field 430. According to this example, table 400 includes records 440-1 through 440-X (also referred to as records 440 and, individually and/or generically as record 440). Each record 440 includes a grouping of data fields 405 through 430. Record 440 may include at least one instance of data that is different from another record 440. For example, the instance of data may pertain to the content (e.g., record 440-1 pertains to a content "A" and record 440-Z pertains to a content "B"), the user locale (e.g., record 440-1 pertains to a locale "A" and record 440-Z pertains to a locale "B"), and/or some other data instance, etc. According to other implementations, the consumption data may include additional, fewer, and/or different types of data. For example, according to other exemplary implementations, consumption data may include on-demand, MBMS session data. The on-demand, MBMS session data may include on-demand, MBMS session identifiers and/or other forms of data that indicates whether an on-demand, MBMS session exists or not relative to a particular content, service area, etc. According to such an implementation, the trigger data may include data that indicates to maintain an on-demand, MBMS session when the result of an analysis of the consumption data yields such a result.

Content identifier field 405 stores a unique content identifier (e.g., a program identifier, etc.) and/or a URI (e.g., an address, a directory path, etc.) pertaining to the content. User locale field 410 stores one or multiple instances of locale data, examples of which have been previously explained. The locale of user device 170 may change over time. In this regard, user device 170 may continually monitor and send updates to content source 130 as to the locale of user device 170. For example, the application, the daemon application, etc., which performs the collection service, may obtain the locale data. When the locale of user device 170 changes (e.g., on a cell identifier level or other configurable level), the logical entity generates and transmits the locale data to content source 130. Within the LTE context, MME 112 obtains updates to the current location of user device 170 from messaging that occurs in accordance with an LTE specification, such as during a tracking area update (TAU) procedure, a handover procedure, etc. This locale data may be used by the application, the daemon application, etc., for transmitting to content source 130.

User concurrency field 415 stores data that indicates a number of users currently receiving the content in a particular location (e.g., a service area, a cell, or other type of locale). Content type field 420 stores data that indicates an attribute of the content. For example, content type field 420 may indicate whether the content is audio and video data, audio data, software, etc.

Content persistency field 425 stores data that indicates a time period during which user device 170 is receiving the content. For example, the data may indicate a time period from an instance of time when the content was initially delivered to user device 170 through the current time. The content persistency data may be used as a basis for determining user concurrency. For example, a user that momentarily or for a brief time has a content session active but delivery is stopped thereafter (e.g., by user, not by user (e.g., lost connection, etc.)) may not be considered a valid user for calculating user concurrency.

Content delivery field 430 stores data pertaining to the delivery of the content. For example, content delivery field 430 stores data indicating a bitrate at which the content is being delivered to user device 170. When an adaptive streaming is used or adaptive downloading is used, content delivery field 430 stores an average bitrate (ABR) over a time window. The time window may be user-configured (e.g., by an administrator). For example, content source 130 may perform multiple samplings of each user device bitrate and calculate the average ABR for each user device 170. Content source 130 may aggregate the ABRs for each user device to calculate an overall ABR. Alternatively, content source 130 may sample a bitrate of each user device, and calculate an overall ABR based on each sampled bitrate. Content delivery field 430 may store ABR data, overall ABR data, and timestamp data pertaining to the ABR values. According to an exemplary implementation, the calculation of the average ABR and/or the overall ABR is performed by the collection service. According to another exemplary implementation, the average ABR and/or the overall ABR is performed by the analytics service.

The bitrate of content delivered to a user device, the ABR of content delivered to a user device, and/or an overall ABR, may be negatively impacted as the number of users and sessions increase, which in turn decreases the available bandwidth, throughput, etc. According to an exemplary embodiment, the logic of the collection service or the analytics service determines when this negative effect occurs and selects an overall ABR that may not have been impacted by such an occurrence. For example, the logic may analyze the bitrate values, the ABR values, and/or the overall ABR value relative to the number of users, in a given service area. The logic may identify a trend of declining bitrates values, ABR values, and/or an overall ABR value, by at least a segment of users due to the increase of concurrent users and sessions. Based on this type of consumption data, the logic calculates and selects an overall ABR that is indicative of a highest bitrate for all users. For example, the logic may calculate multiple overall ABRs, which are mapped to different time periods. The logic may select an earlier, overall ABR value, which represents the bitrate landscape within the service area and during a particular time period, instead of a subsequent, overall ABR value, which represents the bitrate landscape within the given service area and during a subsequent time period, when the subsequent, overall ABR value has decreased relative to the earlier, overall ABR value. The logic may use heuristics to evaluate a decrease in overall ABR, the amount of the decrease, etc., in view of the differences of the number of users attributed to the overall ABRs, and other factors (e.g., weather, etc.).

Additionally, according to an exemplary embodiment, the logic may store historical ABR data (e.g., bitrate values, ABR values, and/or overall ABR values) pertaining to various service areas, times of day, types of content, types of on-demand, MBMS session (e.g., streaming, downloading, etc.), etc. The logic may use this data as a comparative to adjust (e.g., increase or decrease) an overall ABR rate that has been calculated or previously selected. Since broadcasting/multicasting content does not degrade delivery metrics (e.g., bitrate, etc.) due to the number of users, the management service for on-demand, MBMS, as described herein includes analytics that may present users with the highest quality content session. Additionally, the management service provides the on-demand, MBMS for all content and not just a subset of content, which is known ahead of time, as having the potential to become popular.

Content delivery field 430 may store other data pertaining to the delivery of the content and/or a session associated with the delivery of the content (e.g., an MBMS session, a non-MBMS session). For example, content delivery field 430 may store data indicating whether the content is being delivered in a streaming manner, a downloading manner, via a non-MBMS session (e.g., a unicast Web session, etc.), via an MBMS session, or the like. Content source 130 stores the consumption data in a storage area that is accessible to the analytics service.

As illustrated in FIG. 2B, content source 130 collects consumption data. In view of receiving service request 203, content source 130 may collect various types of consumption data, such as content identifier data, user locale data, and content type data. In response to receiving service request 203, content source 130 begins streaming the selected content, which is illustrated as a service response with content 205. During this time, content source 130 may collect other forms of consumption data, such as content delivery data, user concurrency data, and content persistency data.

Figure 2C:
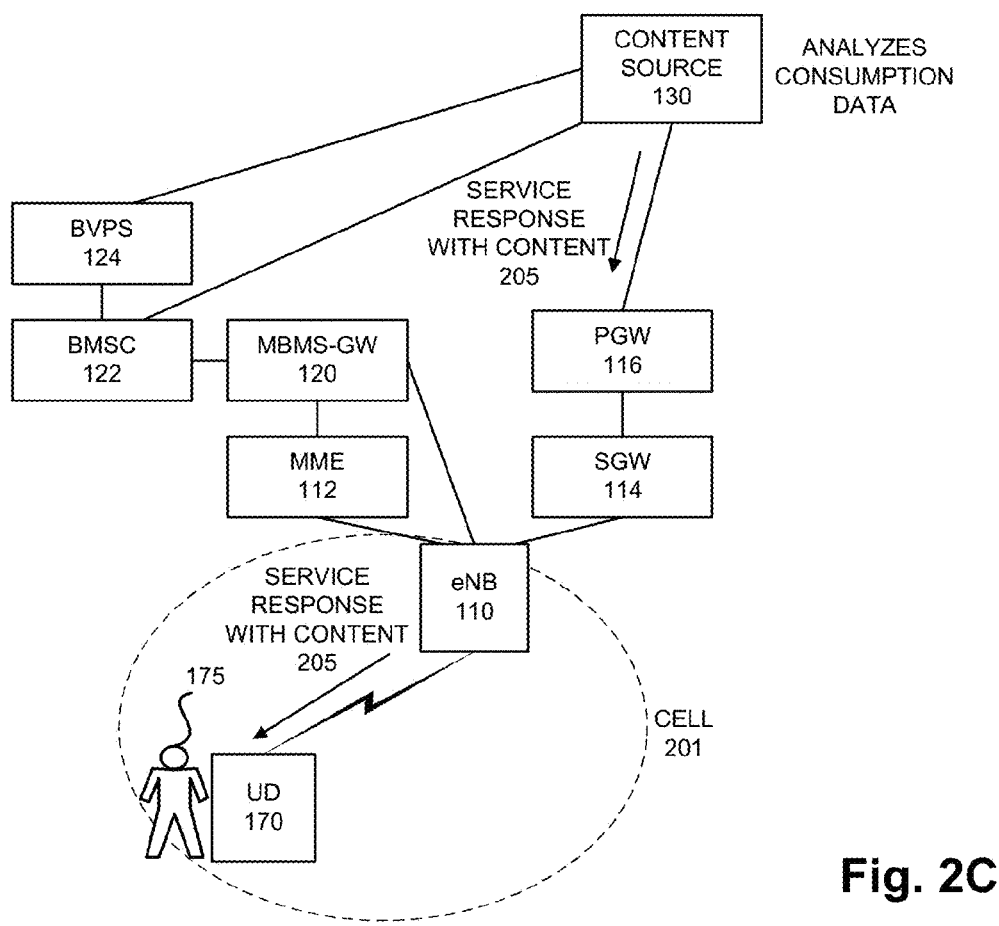

Referring to FIG. 2C, as explained above, content source 130 provides the analytics service. The analytics service analyzes the consumption data. For example, content source 130 includes logic to analyze the consumption data and determine whether an on-demand, MBMS session is to be set up, remain up, or be torn down. According to an exemplary embodiment, the logic includes threshold consumption parameters and threshold values for comparison to corresponding parameters and values included in the consumption data. The threshold consumption parameters and threshold values are user configurable (e.g., by an administrator). Additionally, according to various exemplary embodiments, the parameters used for comparison may be different. For example, according to an exemplary implementation, the logic includes a threshold consumption parameter and threshold value pertaining to a minimum number of users. For example, with respect to a particular content (e.g., the breaking news video) and a particular service area (e.g., cell 201), the logic may compare user concurrency data, which is stored in user concurrency field 415 of table 400, to a threshold value of the threshold consumption parameter. When the consumption data satisfies the threshold value, the logic may set up an on-demand, MBMS session, when an on-demand, MBMS session does not already exist for the particular content in the particular service area, or permit the on-demand, MBMS session to remain active, when the on-demand, MBMS session already exists for the particular content in the particular service area. However, when the consumption data does not satisfy the threshold value, the logic may tear down an on-demand, MBMS session, when an on-demand, MBMS session exists, or omit to set up an on-demand, MBMS session, when an on-demand, MBMS session does not already exist.

According to other exemplary implementations, user concurrency data and, various combinations of other consumption data (e.g., content type, content persistency, content delivery) may be used as criteria by the logic to determine whether to set up an on-demand, MBMS session, tear down an on-demand, MBMS session, or maintain an on-demand, MBMS session. For example, according to an exemplary implementation, the logic includes a threshold consumption parameter and threshold value pertaining to persistency. The logic may filter user concurrency data based on the persistency data pertaining to each active session, user device 170, and/or user 175. For example, a session, user device 170, and/or user 175 that does not satisfy a minimum persistency time period, may be filtered out as consumption data for purposes of comparison with a threshold consumption parameter and threshold value. According to yet other exemplary implementations, other consumption data such as content type may be considered as criteria by the logic. For example, in relation to content delivery, the logic may use a threshold consumption parameter and threshold value that indicates a minimum number of sessions that are streaming the content versus downloading the content before an on-demand, MBMS session is set up. According to an exemplary implementation, the analytics service may be provided based on the following exemplary pseudo code:

As indicated in the exemplary pseudo code above, the logic uses user concurrency and persistency as criteria for starting, stopping, and maintaining an on-demand, MBMS session, along with content identification (e.g., service URI), user locale (e.g., SAID), and content type (e.g., media presentation).

Figure 2D:
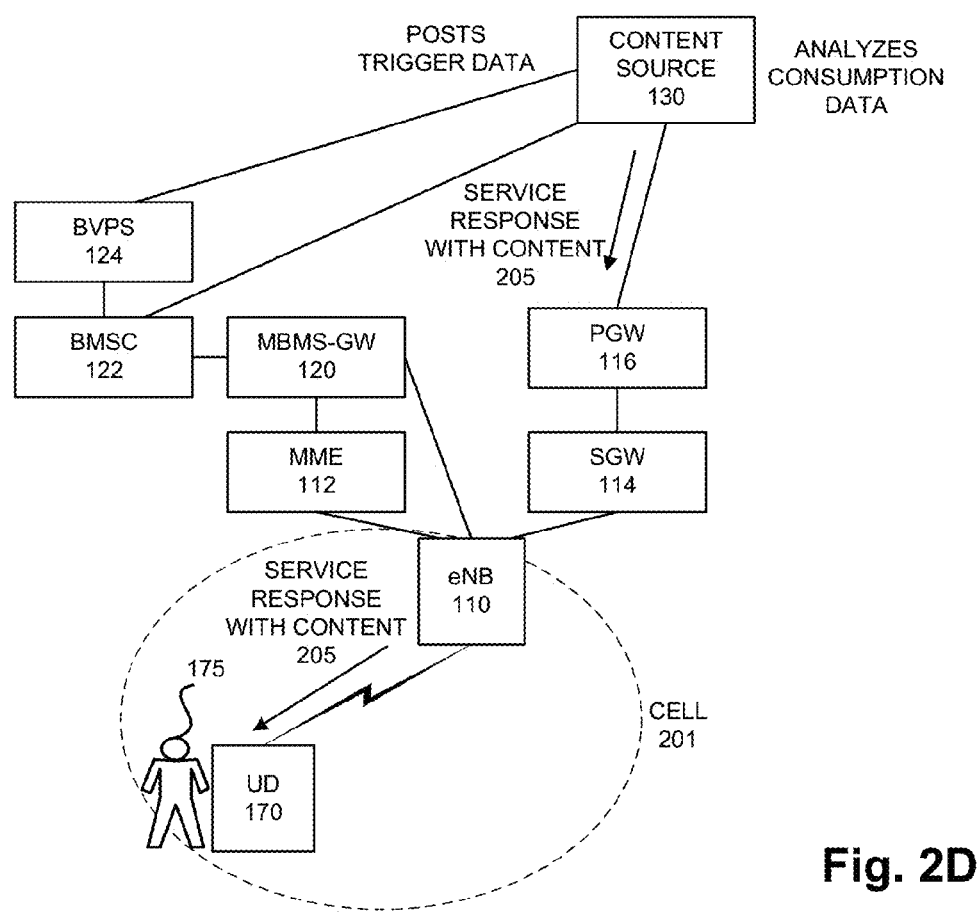

Referring to FIG. 2D, based on the result of analysis, the logic posts trigger data (e.g., a trigger file), which is made available to BVPS 124. For example, BVPS 124 may include logic that monitors a storage location at content 130, which stores the trigger data. BVPS 124 may include a Representational State Transfer (REST)ful Application Programming Interface (API) or a new interface to communicate with content source 130. The trigger data may be obtained by BVPS 124 using a push method, a pull method, a polling method, or other well-known technique. The trigger data may indicate to start or stop an on-demand, MBMS session. Alternatively, the trigger data may indicate to start, stop, or maintain an on-demand, MBMS session. For example, the logic may recognize when an on-demand, MBMS session already exists and the consumption data satisfies threshold values.

Figure 4B:
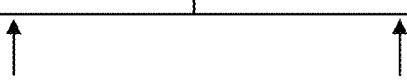
FIG. 4B is a diagram of an exemplary file that stores exemplary trigger data.

FIG. 4B is a diagram that illustrates an exemplary trigger file 440. As illustrated, trigger file 440 includes a listing of parameters 441 and their corresponding values 443. For example, trigger file 440 includes a trigger state 445 and a value 446, a service area 447 and a value 448, a schedule 449 and a value 450, an MBSFN identifier 451 and a value 452, a service URI list 453 and a value 454, and a bitrate 455 and a value 456. According to other implementations, the trigger data may include additional, fewer, and/or different types of data.

Trigger state 455 and value 446 a trigger state (e.g., start or stop; start, stop, or maintain). Service area 447 and value 448 indicate a service area (e.g., locale data). Schedule 449 and value 450 indicate a scheduled time (e.g., "now"; "as soon as possible," a specific time (e.g., future time (e.g., tomorrow, 3:00 pm, etc.)), etc.). Additionally, for example, depending on the results of the comparison of consumption

```
\\ Multicast Trending Record (MTR);
\\ XML Data {Service Area ID (SAID), Service URI List, MediaPresentation}
\\ MTR_Trigger (MTR_T);
\\ HTTP Post to BVPS with MTR data
Concurrent Users = 100; // Number of unique users consuming same content
Persistency Timer = 120; //Time to wait to prevent ping-ponging user
For (ServiceRequest.InServicArea = = TRUE)
{
  If (ServiceRequest.Count > Concurrent Users &&
    ServiceRequest.Persistency > Persistency Timer)
  {
    SAID = ServiceRequest.InServiceArea;
    ServiceURI List = [ServiceRequest.ServiceURI,
       htttp://othercontent1.abc.net,
       http://etc.abc.net]
    MediaPresentation = ServiceRequest.MediaPresentation;
    MTR_Trigger (Start);
  }
  Else {
     If (GetState.MRT_Trigger ( ) = Start)
        { MTR_Trigger (Stop);
        }
        Else (Loop);
        }
     }
} // Close Loop
Function MTR_Trigger (State):
   { HTTP POST/Trigger File_version_XML //BVPS_hostname/MooDProcessing
     Return State;
}
``` data and consumption threshold values, schedule 449 and value 450 may indicate varying degrees of urgency to schedule an on-demand, MBMS session, when an on-demand, MBMS session does not exist but trigger state 445 and value 446 indicate that an on-demand, MBMS session is be set up. For example, when the user concurrency is well above the threshold value (e.g., two-fold, etc.), the schedule time may indicate "now" versus "as soon as possible." Conversely, when the user concurrency is very close to the threshold value (e.g., +10, etc.), the schedule time may indicate "as soon as possible."

MBSFN identifier field 451 and value 452 indicates a collection or grouping of wireless nodes that share the same characteristics with respect to the radio frequency (RF) configuration and orientation. For example, MBSFN identifier field 451 and value 452 may indicate one or multiple eNBs 110 by way of eNB identifiers (e.g., a global eNB identifier, a physical cell identifier (PCI), a tracking area code (TAC), an E-UTRAN Cell Global Identifier (ECGI), etc.) or a group identifier that indicates multiple eNBs 110. MBSFN identifier field 451 and value 452 may indicate the wireless nodes that are going to participate in the on-demand, MBMS session either by way of start, stop, maintain, etc.

Service URI list 453 and value 454 indicates a content identifier and/or content URI. For example, service URI list 453 and value 454 may indicate the URI of the breaking news story. According to other examples, service URI list 453 and value 454 may indicate multiple URIs. For example, assume the MBMS session pertains to a football game. Service URI list 453 and value 454 may indicate a URI for the football game and other URIs may pertain to advertisements during breaks in the game, a URI pertaining to post-game analysis, a URI pertaining to half-time, and so forth. Additionally, for example, the URIs may be targeted to the service area. For example, the URIs may be targeted advertising pertaining to the service area of the on-demand, MBMS session. Additionally, for example, the URIs may pertain to any content that the MBMS service provider would like pre-cached for a future time based on the current demand.

Bitrate 455 and value 456 indicates an overall ABR. As previously described, the collection service or the analytics service may calculate an overall ABR based on sampling the bitrate of each user device 170 during the delivery of content. Thus, while broadcast delivery of content typically does not afford adaptive streaming or adaptive downloading, according to an exemplary embodiment of the management service of on-demand, MBMS, as described herein, an overall ABR is used as a parameter to set up an on-demand, MBMS session that may deliver the content at the best possible resolution to the collective of users.

Figure 2E:
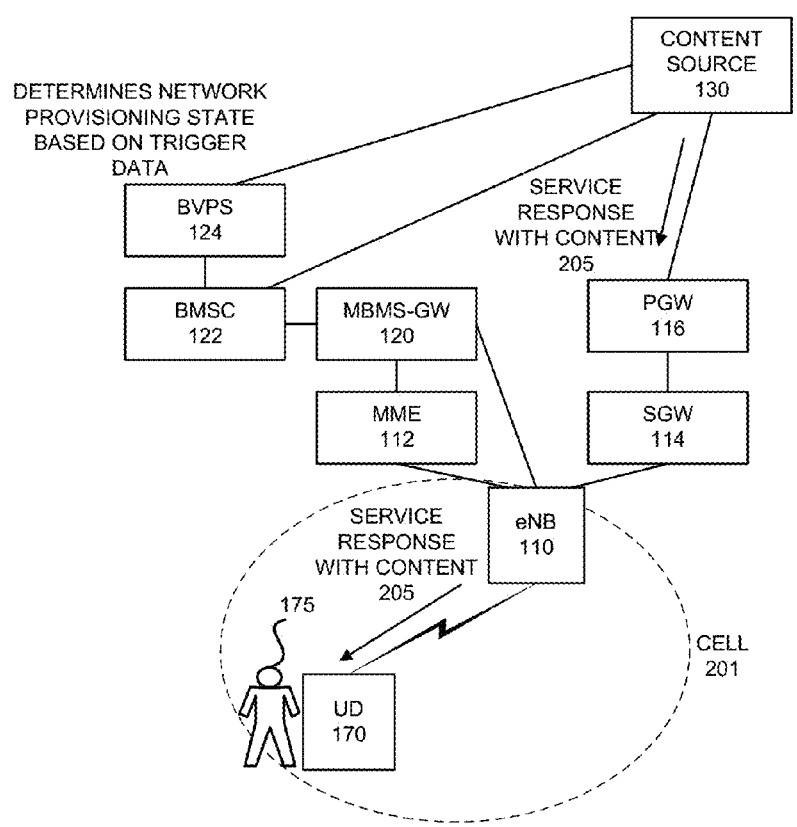

Referring to FIG. 2E, as explained above, BVPS 124 includes logic that provides the network provisioning service. According to an exemplary embodiment, BVPS 124 obtains the trigger data, and reads and interprets the trigger data. Based on an interpretation of the trigger data (e.g., MRT Trigger State, such as trigger state 445 and value 446 of trigger file 440), the logic determines whether to start or stop an on-demand, MBMS session. Alternatively, the trigger data may indicate three possible states (e.g., a start state, a stop state, or a maintain state).

According to this exemplary scenario, assume that the trigger data indicates to start an on-demand, MBMS session in cell 201. According to an exemplary embodiment, BVPS 124 stores provisioning data. The provisioning data includes provisioning profiles that are mapped to service areas. The provisioning profile includes data that allows BVPS 124 to provision an on-demand, MBMS session relative to a service area and content. BVPS 124 selects a provisioning profile based on the trigger data.

According to an exemplary implementation, BVPS 124 stores provisioning data in a file, a data structure, or a database. For example, referring to FIG. 4C, BVPS 124 stores exemplary network provisioning data in a table 460. As illustrated, table 460 includes a service identifier field 465, a user locale field 470, a content delivery field 475, and a content type field 480. According to this example, table 450 includes profiles 485-1 through 485-X (also referred to as profiles 485 and, individually and/or generically as profile 485). Each profile 485 includes a grouping of data fields 465 through 480. Each profile 485 may include at least one instance of data that is different from another profile 485. For example, the instance of data may pertain to the content delivery (e.g., profile 485-1 pertains to a set of network provisioning parameters "A" and profile 485-Z pertains to a set of network provisioning parameters "B"), the user locale (e.g., profile 485-1 pertains to a locale "A" and profile 485-Z pertains to a locale "B"), and/or some other data instance, etc. According to other implementations, the consumption data may include additional, fewer, and/or different types of data. According to an exemplary embodiment, each profile 485 indicates a pre-configured network resource allocation of network resources for an on-demand, MBMS session. In this way, the management service of MBMS may automatically provision, on-demand, by selecting one of the stored provisioning profiles that best matches the criteria provided in the trigger data (e.g., trigger file 440).

Service identifier field 465 stores a unique service identifier that maps to a unique provisioning for an on-demand, MBMS session. According to an exemplary implementation, the service identifiers may be associated with different categories. For example, table 460 may store one set of service identifiers for streaming sessions and another set of service identifiers for downloading sessions. Additionally, or alternatively, other categories may be used based on locale, etc.

User locale field 470 stores data similar to that previously described in relation to user locale field 410 of table 400 and elsewhere in the detailed description. Content delivery field 475 stores data pertaining to the delivery of content. For example, content delivery data includes data that indicates a bitrate at which the content is to be delivered. The content delivery data includes other types of data pertaining to the delivery of content, such as various parameters defined by the 3rd Generation Partnership Project (3GPP) in numerous technical specifications pertaining to MBMS, of which are incorporated herein by reference. Content type field 480 stores data similar to that previously described in relation to content type field 420 of table 400 and elsewhere in the detailed description.

Figure 2F:
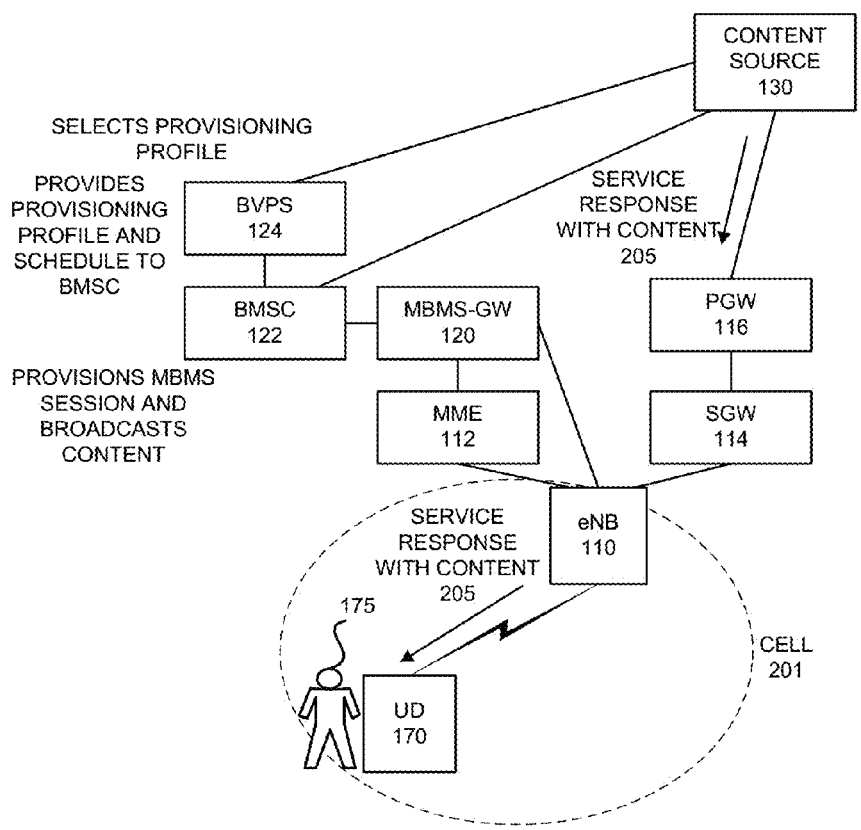

Referring to FIG. 2F, according to this exemplary scenario, and subsequent to determining that an on-demand, MBMS session is to be set up, BVPS 124 selects a provisioning profile from the provisioning data (e.g., network provisioning data table 460). According to an exemplary embodiment, BVPS 124 uses the trigger data to perform a lookup and select a provisioning profile 485. According to an exemplary implementation, BVPS 124 uses content delivery data (e.g., bitrate 455 and value 456), user locale data (e.g., service area 447 and value 448), and content type data (e.g., MBSFN identifier field 451 and value 452). According to other exemplary implementations, BVPS 124 may use additional, different, or fewer instances of data to select a provisioning profile. For example, BVPS 124 may use MBSFN identifier 451 and value 452 when performing the lookup to select eNBs 110 to which the network provisioning data applies and other trigger data (e.g., bitrate 455 and value 456, etc.) to select a provisioning profile 485.

By way of further example, assume that the provisioning data includes multiple provisioning profiles for a given service area, in which each provisioning profile has a unique bitrate. Based on content delivery data (e.g., bitrate 455 and value 456) and user locale data (e.g., service area 447 and value 448), BVPS 124 selects a provisioning profile 485 that best matches the bitrate indicated in the trigger data and pertains to the same user locale. Based on the selected provisioning profile and its corresponding content delivery parameters, etc., BVPS 124 initiates a set up of an on-demand, MBMS session for the service area (e.g., cell 201) and the content (e.g., breaking news video).

According to an exemplary implementation, the network provisioning service may be provided based on the following exemplary pseudo code:

```
\\ MBMS Sessions may be stopped and started when BPVS receives the MTR_Trigger
If (MTRT.Received = = TRUE)
{
  If (State = = Start)
  {
    Parse Trigger File ( );
    [SAID.Schedule = "Now", MBSFN_ArchiTypeID, ServiceURIList, and MooD
    Parameters];
    Select MBSFN_ArchiType( );
    Send Session_Start;
  }
  Else (State =Stop)
    {
    Send Session_Stop;
    Release MBSFN_ArchiType( ):
    }
}
Function Select MBSFN_ArchiType( );
{
  If (ServiceRequest.MediaPresentation = = Live)
    {
    Select Live Service ID; //predefined name and throughput
    }
    Else
    {
    Select FD Service ID; //predefined name and throughput
    }
Hash ArchiTypeProfileTable (Service ID);
Return MBSFN_ArchiTypeID;
}
```

As indicated in the exemplary pseudo code above, BVPS 124 determines the trigger state (e.g., start or stop). When an on-demand, MBMS session does not exist, and the trigger state is "start", BVPS 124 sets up an on-demand, MBMS session based on parsing the trigger file, and reading and interpreting trigger data (e.g., SAID, Service URI List, MBSFN ID, etc.). When an on-demand, MBMS session exists, and the trigger state is "stop", BVPS 124 initiates a session stop and releases network resources. The pseudo code also includes a select MBSFNArchType function that selects a provisioning file based on a media presentation (e.g., (live) streaming versus file download) and throughput (e.g., bitrate).

BVPS 124 also includes logic to schedule the on-demand, MBMS session. According to an exemplary implementation, BVPS 124 uses trigger data (e.g., schedule 449 and value 450 of trigger file 400) for generating a schedule for the on-demand, MBMS session. Additionally, or alternatively, BVPS 124 uses other well-known methods, or scheduling processes set forth in 3GPP standards, to generate the schedule. For example, BVPS 124 may invoke a publication service that publishes schedules for on-demand, MBMS sessions and MBMS sessions. User device 170 may register for a subscription service that allows user device 170 to receive published schedules. For example, user device 170 may receive notifications and/or updates regarding MBMS and on-demand, MBMS schedules.

Figure 2G:
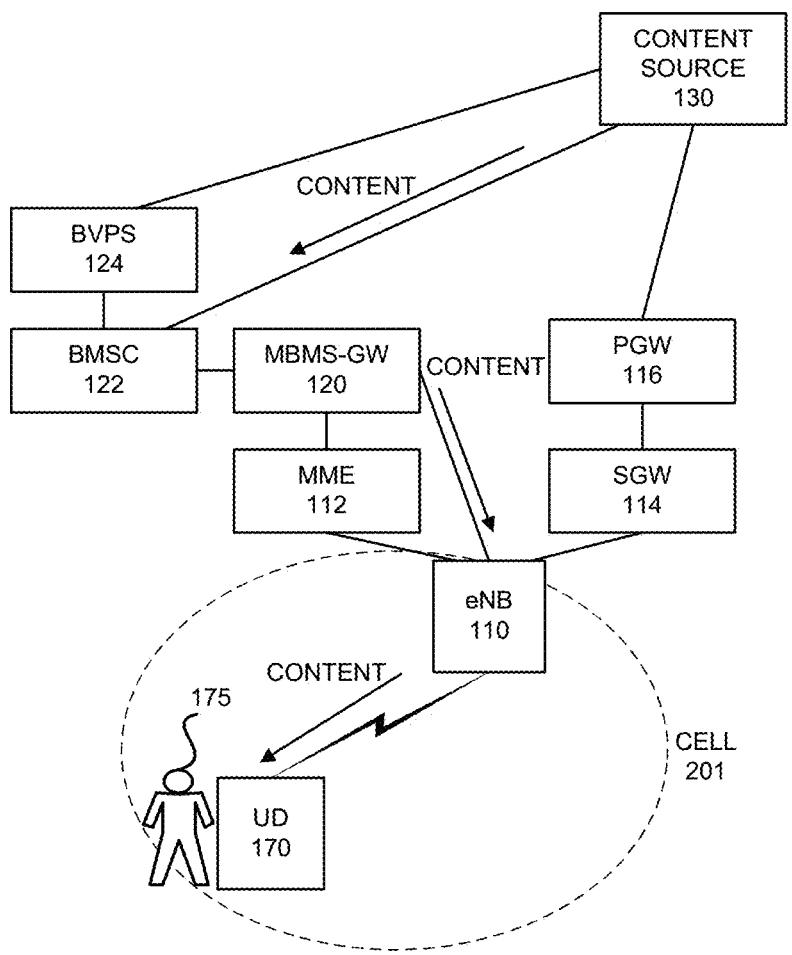

Referring to FIG. 2F, BVPS 124 provides the selected provisioning profile and schedule to BMSC 122. BMSC 122 receives the provisioning profile and the schedule and provisions an on-demand, MBMS session based on this data. An example of setting up an MBMS session is disclosed in U.S. Patent Application Publication No. 2013/0104173 A1, the disclosure of which is incorporated by reference in its entirety. Referring to FIG. 2G, and subsequent to the provisioning, an on-demand, MBMS session is set up, and user 175 is receiving the content (e.g., the breaking news video) in cell 201 via MBMS-GW 120. For example, user device 170 receives an updated schedule announcement via the service announcement channel, which publishes the schedule of the on-demand, MBMS session. Upon receipt of the schedule, user device 170 switches from the unicast session via PGW 116 to the on-demand, MBMS session via MBMS-GW 120 to receive the content (e.g., the breaking news video stream).

As previously described, the collection service, the analytics service, and the network provisioning service continuously operate during the on-demand, MBMS session. When the analytics service determines that the trigger state should change to a "stop" state, then BVPS 124 will tear down an on-demand, MBMS session and release network resources. Alternatively, when the analytics service determines that the trigger state is in a "start" state or a "maintain" state, BVPS 124 will allow the on-demand, MBMS session to continue to remain active.

Figure 2H:
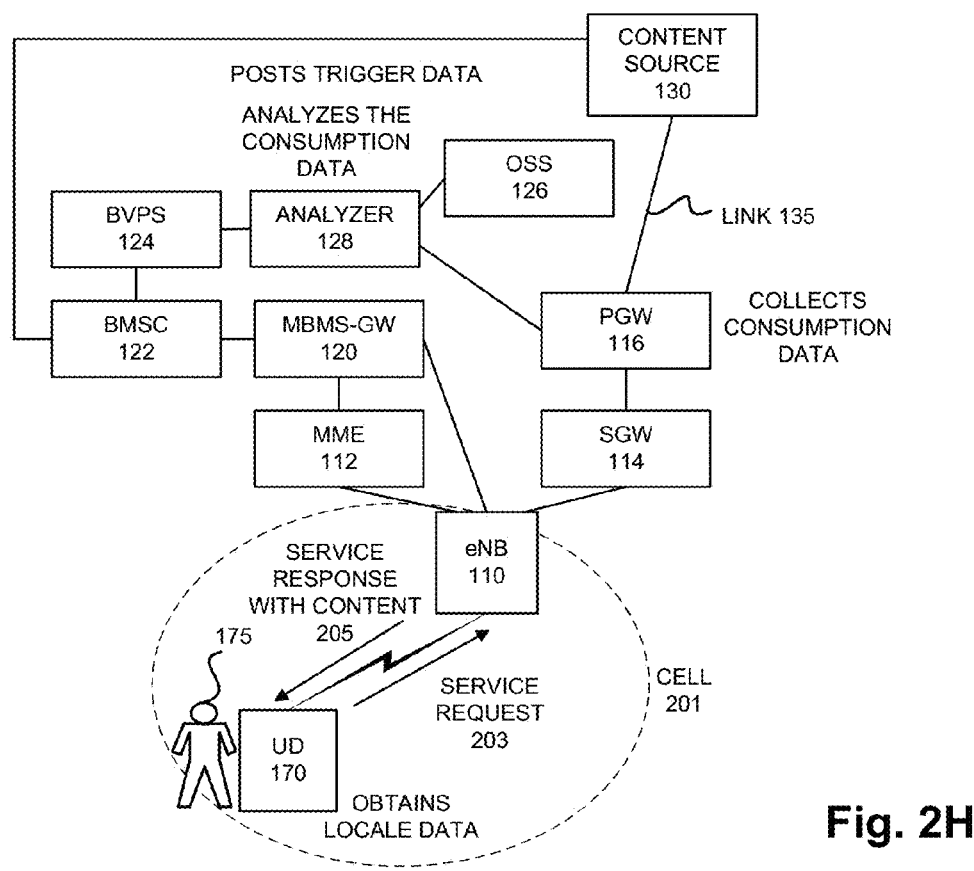
FIGS. 2H-2J are diagrams illustrating an exemplary scenario in which another exemplary embodiment of the management service may be implemented.
Figure 2I:
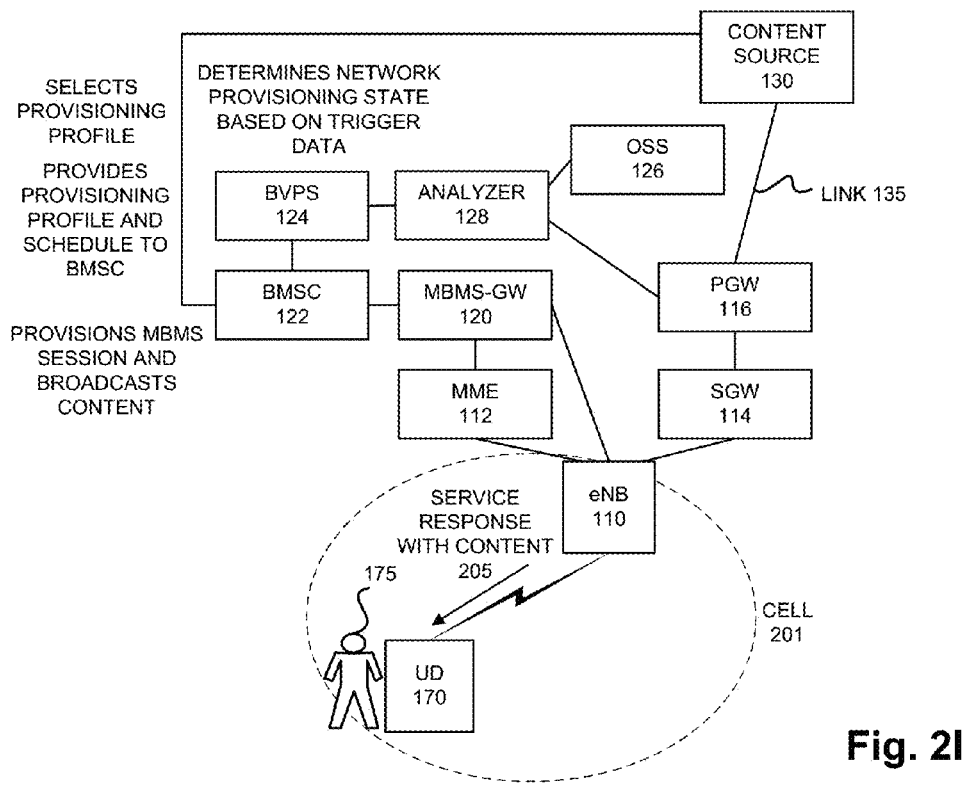
Figure 2J:
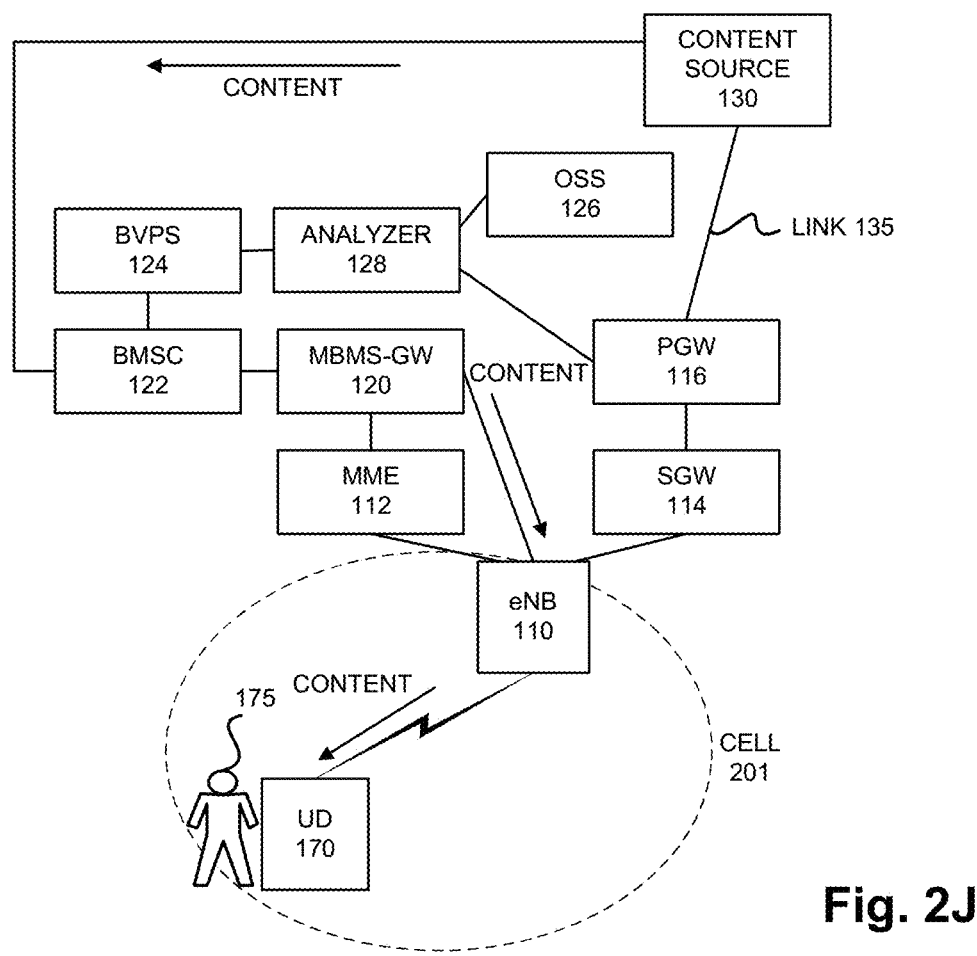

FIGS. 2H-2J are diagrams illustrating another exemplary embodiment of the management service in relation to another exemplary scenario. In contrast to the embodiment of the management service described in relation to FIGS. 2A-2G, according to this exemplary embodiment, the management service may operate with a different network element to provide the collection service and a dedicated network element to provide the analytics service.

For example, referring to FIG. 2H, assume a similar flow as described previously in which user 175 initiates a unicast session for a video. Communication between content source 130 and user device 170 traverses PGW 116. According to this embodiment, PGW 116 collects the consumption data. According to an exemplary implementation, PGW 116 may use deep packet inspection (DPI) or other well-known data extraction methods to extract consumption data from the communication between content source 130 and user device 170. For example, PGW 116 may obtain data of service request 203 and other consumption data traffic that traverses PGW 116 when the unicast session is established and the content is delivered to user device 170. PGW 116 may inspect various portions of traffic (e.g., headers, trailers, payload, etc.). PGW 116 stores the consumption data collected. The consumption data is made available to the analytics service, as provided by analyzer 128.

As further illustrated in FIG. 2H, analyzer 128 analyzes the consumption data. For example, analyzer 128 includes logic to read and interpret the consumption data in a manner previously described in relation to content source 130. OSS 126 may be used to configure the analytics service on analyzer 128. Analyzer 128 may post trigger data based on a result of its analysis of the consumption data. Referring to FIG. 2I, BVPS 124 performs the network provisioning service in a manner similar to that previously described. Referring to FIG. 2J, and subsequent to the provisioning, an on-demand, MBMS session is set up, and user 175 is receiving the content (e.g., the breaking news video) in cell 201 via MBMS-GW 120.

As previously described, the collection service, the analytics service, and the network provisioning service continuously operate during the on-demand, MBMS session. However, since the collection service is implemented at PGW 116 and the on-demand, MBMS session does not traverses PGW 116, according to an exemplary embodiment, user device 170 transmits a ping message to content source 130 via PGW 116. PGW 116 may collect the ping message and analyzer 128 may use the ping message as data to calculate user concurrency and/or persistency. According to other exemplary embodiments, BVPS 124 may obtain consumption data pertaining to MBMS sessions from content source 130.

Figure 3:
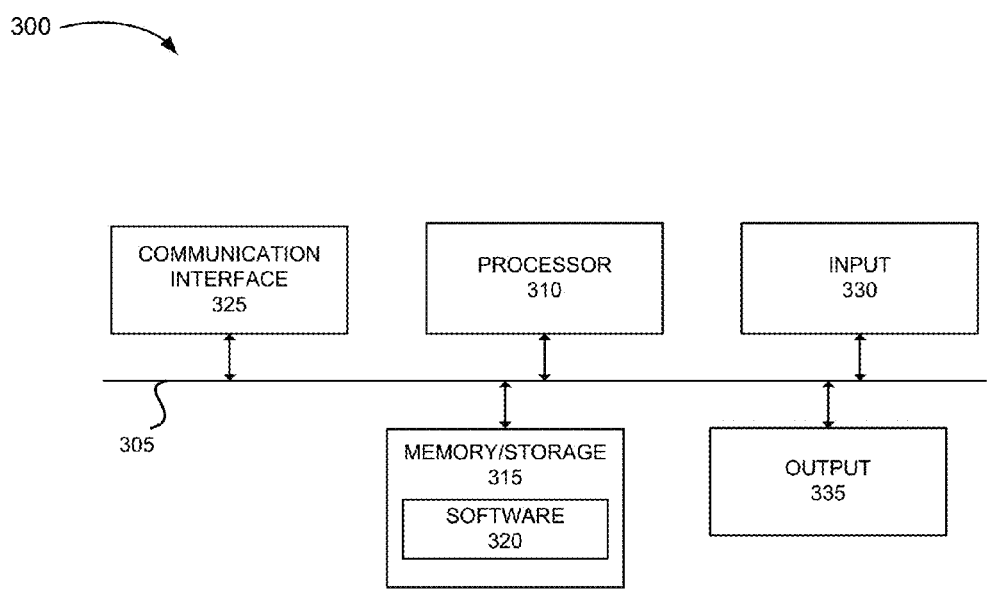
FIG. 3 is a diagram illustrating exemplary components of a device that may correspond to network elements and an end device depicted in the exemplary environment depicted in FIG. 1.

FIG. 3 is a diagram illustrating exemplary components of a device 300 that may correspond to each of the network elements and end device depicted in environment 100. As illustrated in FIG. 3, according to an exemplary embodiment, device 300 includes a bus 305, processor 310, memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, and/or clocks.

Processor 310 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include drives for reading from and writing to the storage medium.

Memory/storage 315 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 315 may store data, software, and/or instructions related to the operation of device 300.

Software 320 includes an application or a program that provides a function and/or a process. Software 320 is also intended to include firmware, middleware, microcode, hardware description language (HDL), and/or other form of instruction. By way of example, with respect to the network elements that include logic to provide the collection service, the analytics service, and the network provisioning service, these network elements may be implemented to include software 320.

Communication interface 325 permits device 300 to communicate with other devices, networks, systems, devices, and/or the like. Communication interface 325 includes one or multiple wireless interfaces and/or wired interfaces. For example, communication interface 325 may include one or multiple transmitters and receivers, or transceivers. Communication interface 325 may include an antenna. Communication interface 325 may operate according to a protocol stack and a communication standard. Communication interface 325 may include various processing logic or circuitry (e.g., multiplexing/de-multiplexing, filtering, amplifying, converting, error correction, etc.).

Input 330 permits an input into device 300. For example, input 330 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 335 permits an output from device 300. For example, output 335 may include a speaker, a display, a light, an output port, and/or some other type of visual, auditory, tactile, etc., output component. According to some embodiments, input 330 and/or output 335 may be a device that is attachable to and removable from device 300.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

Figure 5A:
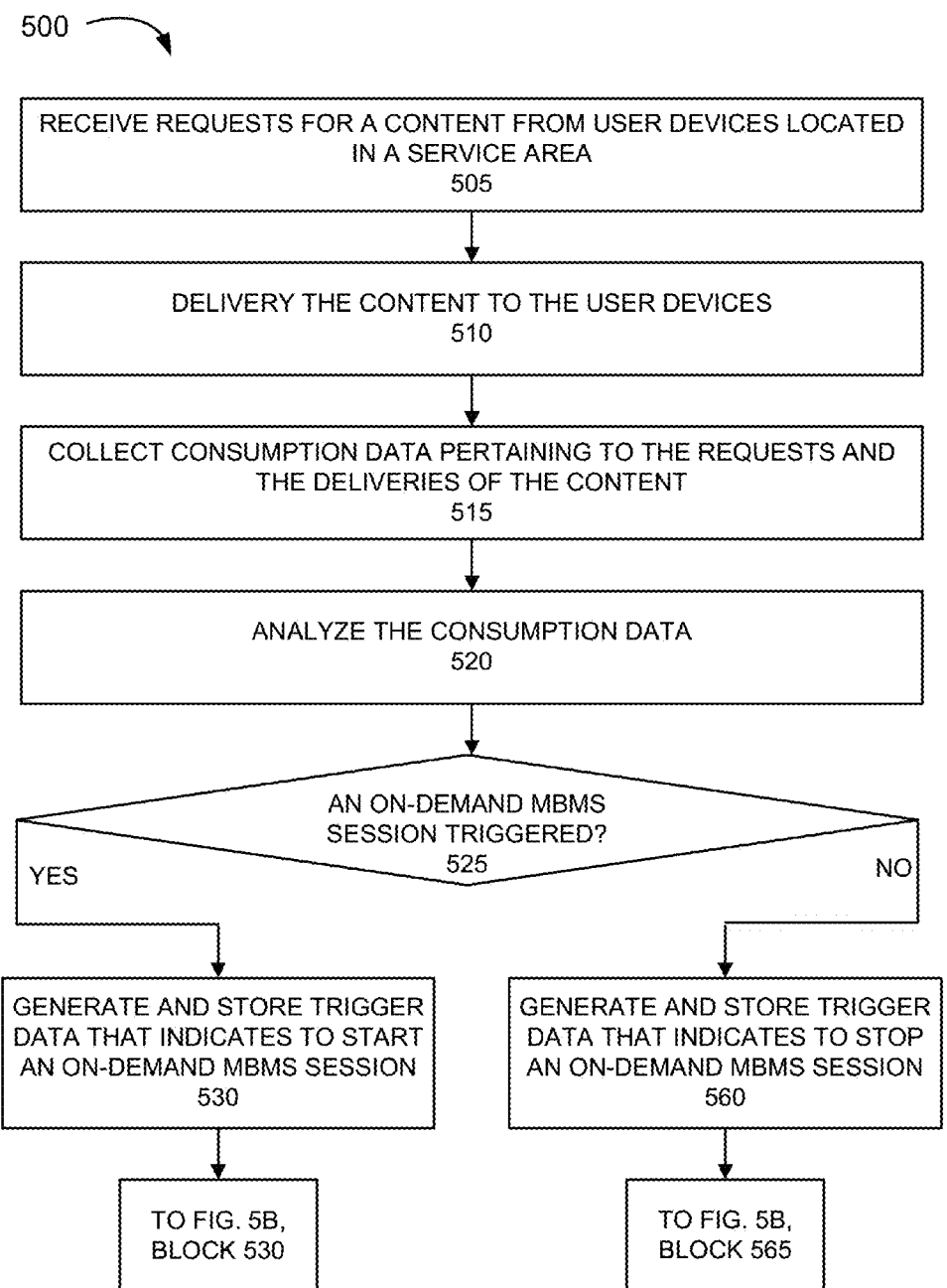
FIGS. 5A and 5B are flow diagrams that illustrate an exemplary process pertaining to the management service.
Figure 5B:
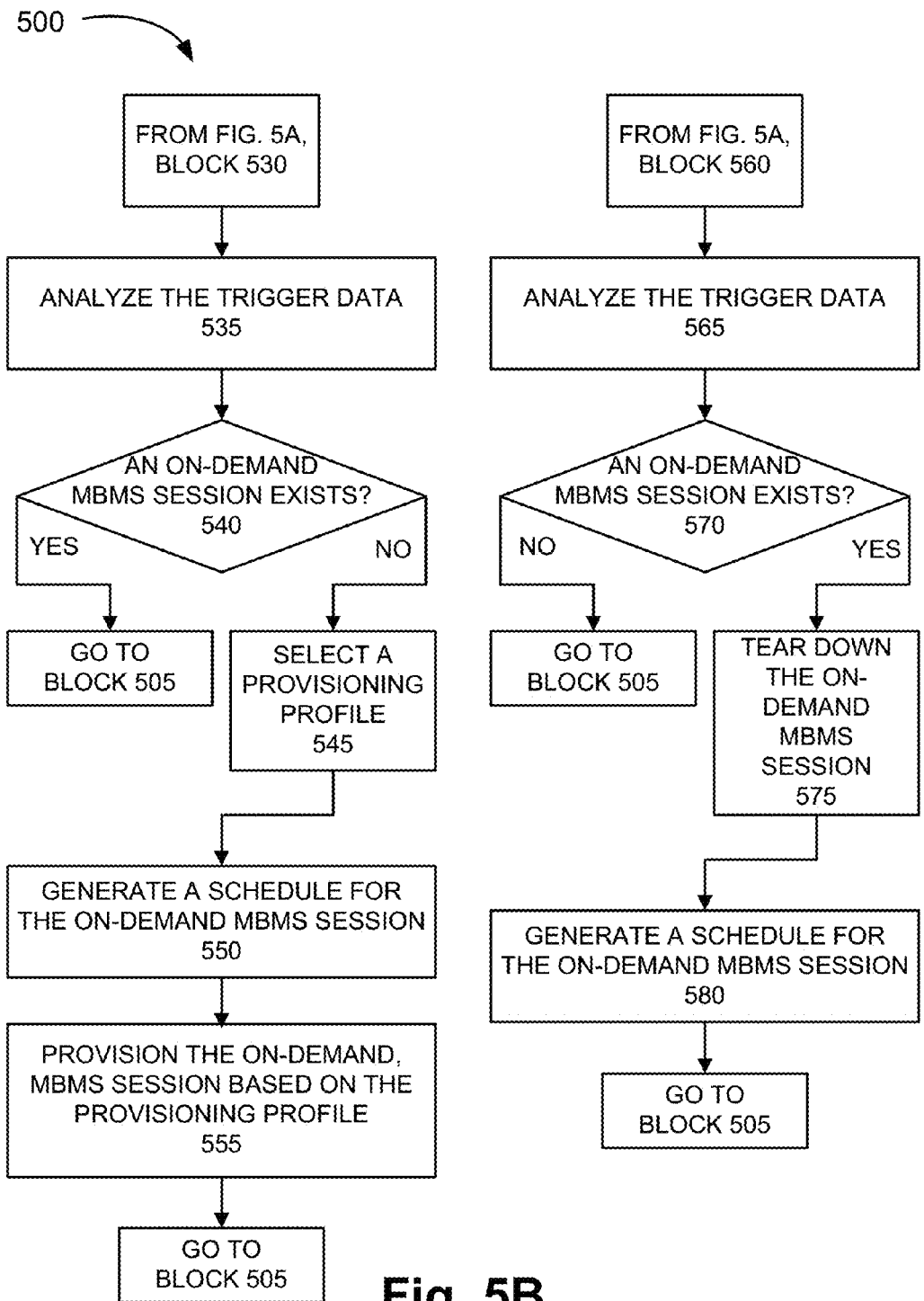

FIGS. 5A and 5B are flow diagrams illustrating an exemplary process 500 pertaining to the management service. Process 500 is directed to a process previously described with respect to FIGS. 2A-2G, FIGS. 2H-2J, and elsewhere in this detailed description, in which a management service of on-demand, MBMS sessions is provided.

According to an exemplary embodiment, a network element that performs the collection service performs some of the steps described in process 500. For example, processor 310 may execute software 320 to provide the collection service. Additionally, for example, a network element that performs the analytics service performs other steps described in process 500. For example, processor 310 may execute software 320 to provide the step described. Additionally, for example, a network element that performs the network provisioning service performs still other steps described in process 500.

According to an exemplary implementation, process 500 may pertain to content that has not been marked or tagged as being popular or having the potential of becoming popular. As previously explained above, program service providers and/or program delivery systems may tag certain content as popular and/or having the potential to become popular. The methods and techniques used to identify and mark contents as popular or having the potential to becoming popular is beyond the scope of this detailed description. In this way, the content is available and likely to be served to users with minimal latency and issues. For example, content, such as new movies, a popular television show, etc., may be marked due to current demand or expected demand from users. According to other embodiments, process 500 may pertain to content that has been marked or tagged as being popular or having the potential of becoming popular. According to yet other embodiments, process 500 may be used in an MBMS system (e.g., which may include the network elements that provide the collection service, the analytics service, and/or the network provisioning service) in which no contents are marked.

Referring to FIG. 5A, in block 505, process 500 may begin with requests for a content being received from user devices located in a service area. For example, content source 130 receives requests from users via user devices 170 for content. According to another example, user devices 170 may not be operated by users. The requests for content may be requests to unicast the content to user devices 170. In block 510, the content is delivered to the user devices. For example, content source 130 transmits the content to the user devices 170 in response to receiving the requests for content.

In block 515, consumption data pertaining to the requests and the deliveries of the content is collected. According to an exemplary embodiment, content source 130 performs the collection service. According to another exemplary embodiment, an anchor point or a gateway element (e.g., PGW 116, a GGSN, etc.) performs the collection service. According to an exemplary implementation, the consumption data includes a content identifier, a location of the user and/or user device, a content type, persistency, content delivery data, and user concurrency. According to an exemplary embodiment, the collection service includes logic to calculate one or multiple instances of consumption data (e.g., user concurrency, content delivery data (e.g., ABR, overall ABR, etc.), persistency, etc.). For example, the collection service uses well-known technologies or methods to perform these tasks. According to other embodiments, the collection service merely collects consumption data that permits the analytics service to calculate particular consumption data. The collection service stores the consumption data and makes the consumption data available to the analytics service.

In block 520, the consumption data is analyzed. According to an exemplary embodiment, content source 130 performs the analytics service. According to another exemplary embodiment, another network element (e.g., analyzer 128) performs the analytics service. The analytics service analyzes the consumption data and based on the analysis determines whether an on-demand, MBMS session is to be set up, remain up, or be torn down. According to an exemplary embodiment, the logic includes threshold consumption parameters and threshold values for comparison to corresponding parameters and values included in the consumption data. The number and type of consumption data used as criteria for making such a determination may vary depending on the implementation. According to an exemplary embodiment, during the analysis, the analytics service includes logic to calculate one or multiple instances of consumption data (e.g., user concurrency, content delivery data (e.g., ABR, overall ABR, etc.), persistency, etc.) based on the raw consumption data. For example, the analytics service uses well-known technologies or methods to perform these tasks.

In block 525, it is determined whether an on-demand, MBMS session is triggered. For example, the analytics service compares some or all of the consumption data to the corresponding threshold consumption parameters and threshold values. Based on a result of the comparison, the analytics service determines whether an on-demand, MBMS session is triggered. For example, when the consumption data satisfies the threshold value, the logic may set up an on-demand, MBMS session, when an on-demand, MBMS session does not already exist for the particular content in the particular service area, or permit the on-demand, MBMS session to remain active, when the on-demand, MBMS session already exists for the particular content in the particular service area. Alternatively, when the consumption data fails to satisfy the threshold value, the logic may tear-down an on-demand, MBMS session, when an on-demand, MBMS session exists for the particular content in the particular service area, or simply omit to set up an on-demand, MBMS session, when an on-demand, MBMS session does not exist for the particular content in the particular service area.

When it is determined that an on-demand, MBMS session is triggered (block 525—YES), trigger data is generated and stored that indicates to start an on-demand, MBMS session (block 530). For example, the analytics service generates and transmits trigger data (e.g., trigger file 440). The trigger data includes data indicating an MBMS state (e.g., start or maintain). The analytics service makes available the trigger data to the network provisioning service.

Referring to FIG. 5B, in block 535, the trigger data is analyzed. According to an exemplary embodiment, BVPS 124 provides the network provisioning service. The network provisioning service analyzes the trigger data. Based on the analysis, the network provisioning service determines the on-demand MBMS state (e.g., start or stop; start, stop, or maintain). In block 540, it is determined whether an on-demand, MBMS session exists. For example, since the trigger data indicates to start an on-demand, the analytics service determines whether an on-demand, MBMS session exists. When it is determined that an on-demand, MBMS session exists (block 540—YES), then process 500 continues to block 505. That is, the analytics service may allow an existing, on-demand, MBMS session to remain active. When it is determined that an on-demand, MBMS session does not exist (block 540—NO), then a provisioning profile is selected (block 545). For example, the analytics service uses some or all of the trigger data to select a provisioning profile. The provisioning profile includes network provisioning data, which is used to set up an on-demand, MBMS session within a particular service area in relation to the content.

In block 550, a schedule for the on-demand, MBMS session is generated (block 550). For example, the analytics service generates an on-demand MBMS schedule. The on-demand, MBMS schedule indicates an on-demand, MBMS schedule is available in the service area for the content. The schedule may be published and user devices may subscribe to the publication service. The user devices may receive the schedule via a service channel. In block 555, the on-demand, MBMS session is provisioned based on the provisioning profile. For example, BVPS 124 communicates with BMSC 122 to set up an on-demand, MBMS session. BMSC 122 and MBMS-GW 120 uses the network provisioning data to set up the on-demand, MBMS session.

Referring back to FIG. 5A, when it is determined that an on-demand, MBMS session is triggered (block 525—NO), trigger data is generated and stored that indicates to stop an on-demand, MBMS session (block 560). For example, the analytics service generates and transmits trigger data (e.g., trigger file 440). The trigger data includes data indicating an MBMS state (e.g., stop). The analytics service makes available the trigger data to the network provisioning service.

Referring to FIG. 5B, in block 565, the trigger data is analyzed. The network provisioning service analyzes the trigger data. Based on the analysis, the network provisioning service determines the on-demand MBMS state (e.g., start or stop; start, stop, or maintain). In block 570, it is determined whether an on-demand, MBMS session exists. For example, since the trigger data indicates to stop an on-demand, the analytics service determines whether an on-demand, MBMS session exists. When it is determined that an on-demand, MBMS session exists (block 570—YES), then the on-demand, MBMS session is torn down (block 575). For example, BVPS 124 communicates with BMSC 122 and/or MBMS-GW 120 to tear down the on-demand, MBMS session and free the network resources. In block 580, a schedule for the on-demand, MBMS session is generated (block 580). For example, the analytics service generates an on-demand MBMS schedule. The on-demand, MBMS schedule indicates the on-demand, MBMS schedule is no longer available in the service area for the content. The schedule may be published and user devices may subscribe to the publication service. The user devices may receive the schedule via a service channel. The user devices may automatically initiate a unicast session (e.g., with content source 130) to receive the remaining portion of the content. Thereafter, process 500 continues to block 505. When it is determined that an on-demand, MBMS session does not exist (block 570—NO), then process 500 continues to block 505.

Although FIGS. 5A and 5B illustrate an exemplary process pertaining to the management service for on-demand, MBMS sessions, according to other embodiments, process 500 may include additional operations, fewer operations, and/or different operations than those illustrated in FIGS. 5A and 5B, and as described herein.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The term "exemplary," as used herein means "serving as an example." Any embodiment or implementation described as "exemplary" is not necessarily to be construed as preferred or advantageous over other embodiments or implementations.

In addition, while a series of blocks has been described with regard to the process illustrated in FIGS. 5A and 5B, the order of the blocks may be modified according to other embodiments. Further, non-dependent blocks may be performed in parallel or simultaneously. For example, according to an exemplary implementation, two or more operations may be performed using parallel processing or a multitasking procedure. Additionally, other processes described in this description may be modified and/or non-dependent operations may be performed in parallel or simultaneously.

The embodiments described herein may be implemented in many different forms of software executed by hardware. For example, a process or a function may be implemented as "logic" or as a "component." The logic or the component may include, for example, hardware (e.g., processor 310, etc.), or a combination of hardware and software (e.g., software 320). The embodiments have been described without reference to the specific software code since the software code can be designed to implement the embodiments based on the description herein and commercially available software design environments/languages.

In the preceding specification, various embodiments have been described with reference to the accompanying drawings. However, various modifications and changes may be made thereto, and additional embodiments may be implemented, without departing from the broader scope of the invention as set forth in the claims that follow and various obvious modifications and equivalent arrangements. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Additionally, embodiments described herein may be implemented as a non-transitory storage medium that stores data and/or information, such as instructions, program code, a computer program, software, a software application, a data structure, a program module, an application, machine code, a file that can be executed using an interpreter, etc. The program code, instructions, application, etc., is readable and executable by a processor (e.g., processor 310) of a computational device. A non-transitory storage medium includes one or more of the storage mediums described in relation to memory/storage 315.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction described in the present application should be construed as critical or essential to the embodiments described herein unless explicitly described as such.

What is claimed is:

1. A method comprising:
receiving, by a Multimedia Broadcast Multicast Service (MBMS) system, requests for a content from user devices located within a service area;
transmitting, by the MBMS system, the content to the user devices in response to receiving the requests;
collecting, by the MBMS system, consumption data pertaining to the requests and the transmitting of the content, wherein the collecting comprises:
calculating, by the MBMS system, an average bitrate (ABR) for each of the user devices; and
calculating, by the MBMS system, an overall ABR based on aggregating the calculated ABRs of the user devices, and wherein the consumption data includes the overall ABR pertaining to the user devices;
analyzing, by the MBMS system, the consumption data;
determining, by the MBMS system, whether an on-demand, MBMS session is triggered based on the analysis of the consumption data;
generating, by the MBMS system, trigger data based on the analysis of the consumption data, wherein the trigger data includes data that indicates one of to start or to stop the on-demand, MBMS session and data that includes one or more provisioning parameters and values;
storing, by the MBMS system, network provisioning profiles pertaining to the service area, wherein each network provisioning profile includes network provisioning parameters and at least one unique network provisioning parameter and value relative to the other network provisioning profiles;
selecting, by the MBMS system, one of the network provisioning profiles when the trigger data indicates to start the on-demand, MBMS session, and wherein the selecting of the one of the network provisioning profiles is based on a match between the one or more provisioning parameters and values with the at least one unique network provisioning parameter;
setting up, by the MBMS system, the on-demand, MBMS session based on the one of the network provisioning profiles; and
transmitting, by the MBMS system, the content via the on-demand, MBMS session within the service area.

2. The method of claim 1, further comprising:
calculating the overall ABR pertaining to the user devices in relation to the transmitting of the content, wherein the one or more provisioning parameters and values include an overall ABR parameter and value, and wherein the at least one unique network provisioning parameter and value includes the overall ABR parameter and value.

3. The method of claim 1, wherein when the trigger data indicates to stop the on-demand, MBMS session, the method further comprises:
determining whether the on-demand, MBMS session is active for the content and within the service area; and
tearing down the on-demand, MBMS session based on determining that the on-demand, MBMS session is active.

4. The method of claim 1, wherein the MBMS system stores contents that are marked as popular, and wherein the content is not marked as popular.

5. The method of claim 1, wherein the selecting further comprises:
selecting the one of the network provisioning profiles based on one of the network provisioning parameters, wherein the one of the network provisioning parameters indicates one of streaming the content or downloading the content.

6. The method of claim 1, further comprising:
collecting consumption data during the transmitting of the content via the on-demand, MBMS session;
analyzing the consumption data collected during the on-demand, MBMS session; and
determining whether the on-demand, MBMS session is to stop or remain active based on the analysis of the consumption data collected during the on-demand, MBMS session.

7. The method of claim 1, wherein the consumption data includes a content identifier pertaining to the content, a locale identifier pertaining to the service area, user concurrency data that indicates a number of the user devices receiving the content, content type data that indicates one or more attributes of the content, content persistency data that indicates a time period during which each of the user devices is receiving the content, and content delivery data that indicates attributes of the delivery of the content, wherein the content delivery data includes a delivery method including one of downloading or streaming.

8. The method of claim 1, wherein each of the requests carries a service area identifier that indicates the service area, and wherein the consumption data includes the service area identifiers.

9. A Multimedia Broadcast Multicast Service (MBMS) system comprising:
a communication interface;
a memory, wherein the memory stores instructions; and
a processor, wherein the processor executes the instructions to:
receive, via the communication interface, requests for a content from user devices located within a service area;

transmit, via the communication interface, the content to the user devices in response to the requests;
collect consumption data pertaining to the requests and the transmissions of the content, wherein the collecting comprises:
calculate an average bitrate (ABR) for each of the user devices; and
calculate, an overall ABR based on an aggregation of the calculated ABRs of the user devices, and wherein the consumption data includes the overall ABR pertaining to the user devices;
analyze the consumption data;
determine whether an on-demand, MBMS session is triggered based on the analysis of the consumption data;
generate trigger data based on the analysis of the consumption data, wherein the trigger data includes data that indicates one of to start or to stop the on-demand, MBMS session and data that includes one or more provisioning parameters and values;
store network provisioning profiles pertaining to the service area, wherein each network provisioning profile includes network provisioning parameters and at least one unique network provisioning parameter and value relative to the other network provisioning profiles;
select one of the network provisioning profiles when the trigger data indicates to start the on-demand, MBMS session, and wherein a selection of the one of the network provisioning profiles is based on a match between the one or more provisioning parameters and values with the at least one unique network provisioning parameter;
set up the on-demand, MBMS session based on the one of the network provisioning profiles; and
transmit the content via the on-demand, MBMS session within the service area.

10. The MBMS system of claim 9, wherein the processor further executes the instructions to:
calculate the overall ABR pertaining to the user devices in relation to a transmission of the content, wherein the one or more provisioning parameters and values include an overall ABR parameter and value, and wherein the at least one unique network provisioning parameter and value includes the overall ABR parameter and value.

11. The MBMS system of claim 9, wherein when the trigger data indicates to stop the on-demand, MBMS session, the processor further executes the instructions to:
determine whether the on-demand, MBMS session is active for the content and within the service area; and
tear down the on-demand, MBMS session based on a determination that the on-demand, MBMS session is active.

12. The MBMS system of claim 9, wherein the MBMS system stores contents that are marked as popular, and wherein the content is not marked as popular, and wherein the MBMS system comprises a content server that services the requests for the content, and wherein the consumption data is collected and analyzed by the content server.

13. The MBMS system of claim 9, wherein the MBMS system comprises:
a packet data network gateway (PGW) of a Long Term Evolution (LTE) or an LTE-Advanced network, and wherein when collecting the consumption data, the processor of the PGW executes the instructions to:
collect the consumption data pertaining to the requests and the transmissions of the content; and wherein the MBMS system further comprises:
an analytics device, wherein when analyzing the consumption data, determining whether the on-demand, MBMS session is triggered, and generating the trigger data, the analytics device is communicatively coupled to the PGW, and the processor of the analytics device executes the instructions to:
analyze the consumption data;
determine whether the on-demand, MBMS session is triggered based on the analysis of the consumption data; and
generate the trigger data.

14. The MBMS system of claim 9, wherein the MBMS system comprises a content server that stores the content and services the requests, and wherein when collecting the consumption data, the processor of the content server executes the instructions to:
collect the consumption data pertaining to the requests and the transmissions of the content, and wherein when analyzing the consumption data, determining whether the on-demand, MBMS session is triggered, and generating the trigger data, the processor of the content server executes the instructions to:
analyze the consumption data;
determine whether the on-demand, MBMS session is triggered based on the analysis of the consumption data; and
generate the trigger data.

15. The MBMS system of claim 9, wherein the MBMS system comprises a Broadcast Video Provisioning System (BVPS) device, wherein when storing the network provisioning profiles, selecting the one of the network provisioning profiles, and setting up the on-demand, MBMS session, the processor of the BVPS executes the instructions to:
store the network provisioning profiles pertaining to the service area;
select the one of the network provisioning profiles when the trigger data indicates to start the on-demand, MBMS session; and
set up the on-demand, MBMS session based on the one of the network provisioning profiles, wherein the processor of BVPS further executes the instructions to:
transmit, to a Broadcast Multicast Service Center (BMSC), the one of the network provisioning profiles.

16. A non-transitory, computer-readable storage medium storing instructions executable by a processor of a computational device, which when executed cause the computational device to:
receive requests for a content from user devices located within a service area;
transmit the content to the user devices in response to the requests;
collect consumption data pertaining to the requests and the transmitting of the content, wherein the collecting comprises:
calculate an average bitrate (ABR) for each of the user devices; and
calculate, an overall ABR based on an aggregation of the calculated ABRs of the user devices, and wherein the consumption data includes the overall ABR pertaining to the user devices;

analyze the consumption data;

determine whether an on-demand, Multimedia Broadcast Multicast Service (MBMS) session is triggered based on the analysis of the consumption data;

generate trigger data based on the analysis of the consumption data, wherein the trigger data includes data that indicates one of to start or to stop the on-demand, MBMS session and data that includes one or more provisioning parameters and values;

store network provisioning profiles pertaining to the service area, wherein each network provisioning profile includes network provisioning parameters and at least one unique network provisioning parameter and value relative to the other network provisioning profiles;

select one of the network provisioning profiles when the trigger data indicates to start the on-demand, MBMS session, and wherein a selection of the one of the network provisioning profiles is based on a match between the one or more provisioning parameters and values with the at least one unique network provisioning parameter;

set up the on-demand, MBMS session based on the one of the network provisioning profiles; and transmit the content, via the on-demand, MBMS session, within the service area.

17. The non-transitory, computer-readable storage medium of claim 16, wherein the instructions further comprise instructions to:

calculate the overall ABR pertaining to the user devices in relation to a transmission of the content, wherein the one or more provisioning parameters and values include an overall ABR parameter and value, and wherein the at least one unique network provisioning parameter and value includes the overall ABR parameter and value.

18. The non-transitory, computer-readable storage medium of claim 16, wherein the consumption data includes a content identifier pertaining to the content, a locale identifier pertaining to the service area, user concurrency data that indicates a number of the user devices receiving the content, content type data that indicates one or more attributes of the content, content persistency data that indicates a time period during which each of the user devices is receiving the content, and content delivery data that indicates attributes of the delivery of the content, wherein the content delivery data includes a delivery method including one of downloading or streaming.

19. The non-transitory, computer-readable storage medium of claim 16, wherein the instructions to select further comprise instructions to:

select the one of the network provisioning profiles based on one of the network provisioning parameters, wherein the one of the network provisioning parameters indicates one of streaming the content or downloading the content.

20. The non-transitory, computer-readable storage medium of claim 16, wherein the content is not pre-defined as popular.

* * * * *